(12) United States Patent
Abedini et al.

(10) Patent No.: US 11,870,737 B2
(45) Date of Patent: Jan. 9, 2024

(54) ENHANCED DUPLEXING CAPABILITY SIGNALING

(71) Applicant: QUALCOMM Incorporated, San Diego, CA (US)

(72) Inventors: Navid Abedini, Basking Ridge, NJ (US); Jianghong Luo, Skillman, NJ (US); Luca Blessent, Whitehouse Station, NJ (US); Qian Zhang, Basking Ridge, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/447,036

(22) Filed: Sep. 7, 2021

(65) Prior Publication Data

US 2022/0131680 A1 Apr. 28, 2022

Related U.S. Application Data

(60) Provisional application No. 63/198,489, filed on Oct. 22, 2020.

(51) Int. Cl.
*H04L 5/14* (2006.01)
*H04L 5/16* (2006.01)
*H04W 28/16* (2009.01)

(52) U.S. Cl.
CPC .............. *H04L 5/1461* (2013.01); *H04L 5/16* (2013.01); *H04W 28/16* (2013.01)

(58) Field of Classification Search
CPC ......... H04L 5/1461; H04L 5/16; H04W 28/16
See application file for complete search history.

(56) References Cited

U.S. PATENT DOCUMENTS

| | | | |
|---|---|---|---|
| 2020/0413451 A1* | 12/2020 | Taherzadeh Boroujeni | ............... H04B 7/18504 |
| 2021/0051653 A1* | 2/2021 | Park | ....................... H04W 72/21 |
| 2022/0217772 A1* | 7/2022 | Harada | .............. H04W 74/0808 |

FOREIGN PATENT DOCUMENTS

| WO | WO-2020202190 A1 * | 10/2020 | |
|---|---|---|---|
| WO | WO-2020222458 A1 * | 11/2020 | ............. H04B 1/525 |

* cited by examiner

*Primary Examiner* — Jackie Zuniga Abad
(74) *Attorney, Agent, or Firm* — Harrity & Harrity, LLP

(57) ABSTRACT

Various aspects of the present disclosure generally relate to wireless communication. In some aspects, a first wireless node may transmit enhanced duplexing capability signaling that indicates a level from a plurality of levels, wherein the level corresponds to a supported enhanced duplexing capability of the first wireless node. The first wireless node may communicate with at least a second wireless node based at least in part on the supported enhanced duplexing capability of the first wireless node. Numerous other aspects are provided.

30 Claims, 14 Drawing Sheets

800 ⟶

ENHANCED DUPLEXING CAPABILITY SIGNALING

CROSS-REFERENCE TO RELATED APPLICATION

This Patent Applications claims priority to U.S. Provisional Patent Application No. 63/198,489, filed on Oct. 22, 2020, entitled "ENHANCED DUPLEXING CAPABILITY SIGNALING," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for enhanced duplex capability signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless node includes transmitting enhanced duplexing capability signaling that indicates a level from a plurality of levels, wherein the level corresponds to a supported enhanced duplexing capability of the first wireless node; and communicating with at least a second wireless node based at least in part on the supported enhanced duplexing capability of the first wireless node.

In some aspects, a method of wireless communication performed by a control node includes receiving, from a first wireless node, enhanced duplexing capability signaling that indicates a level from a plurality of levels, wherein the level corresponds to a supported enhanced duplexing capability of the first wireless node; and performing an action for one or more of the first wireless node or a second wireless node based at least in part on the enhanced duplexing capability signaling received from the first wireless node.

In some aspects, a method of wireless communication performed by a first wireless node includes receiving enhanced duplexing capability signaling that indicates a level from a plurality of levels, wherein the level corresponds to a supported enhanced duplexing capability of a second wireless node; and communicating with the second wireless node based at least in part on the enhanced duplexing capability signaling.

In some aspects, a first wireless node for wireless communication includes a memory and one or more processors, coupled to the memory, configured to: transmit enhanced duplexing capability signaling that indicates a level from a plurality of levels, wherein the level corresponds to a supported enhanced duplexing capability of the first wireless node; and communicate with at least a second wireless node based at least in part on the supported enhanced duplexing capability of the first wireless node.

In some aspects, a control node for wireless communication includes a memory and one or more processors, coupled to the memory, configured to: receive, from a first wireless node, enhanced duplexing capability signaling that indicates a level from a plurality of levels, wherein the level corresponds to a supported enhanced duplexing capability of the first wireless node; and perform an action for one or more of the first wireless node or a second wireless node based at least in part on the enhanced duplexing capability signaling received from the first wireless node.

In some aspects, a first wireless node for wireless communication includes a memory and one or more processors, coupled to the memory, configured to: receive enhanced duplexing capability signaling that indicates a level from a plurality of levels, wherein the level corresponds to a supported enhanced duplexing capability of a second wireless node; and communicate with the second wireless node based at least in part on the enhanced duplexing capability signaling.

In some aspects, a non-transitory computer-readable medium storing a set of instructions for wireless communication includes one or more instructions that, when executed by one or more processors of a first wireless node, cause the first wireless node to: transmit enhanced duplexing capability signaling that indicates a level from a plurality of levels, wherein the level corresponds to a supported enhanced duplexing capability of the first wireless node; and communicate with at least a second wireless node based at least in part on the supported enhanced duplexing capability of the first wireless node.

In some aspects, a non-transitory computer-readable medium storing a set of instructions for wireless communication includes one or more instructions that, when executed by one or more processors of a control node, cause the control node to: receive, from a first wireless node, enhanced duplexing capability signaling that indicates a level from a plurality of levels, wherein the level corresponds to a supported enhanced duplexing capability of the first wireless node; and perform an action for one or more of the first wireless node or a second wireless node based at least in part on the enhanced duplexing capability signaling received from the first wireless node.

In some aspects, a non-transitory computer-readable medium storing a set of instructions for wireless communication includes one or more instructions that, when executed by one or more processors of a first wireless node, cause the first wireless node to: receive enhanced duplexing capability signaling that indicates a level from a plurality of levels, wherein the level corresponds to a supported enhanced duplexing capability of a second wireless node; and communicate with the second wireless node based at least in part on the enhanced duplexing capability signaling.

In some aspects, a first apparatus for wireless communication includes means for transmitting enhanced duplexing capability signaling that indicates a level from a plurality of levels, wherein the level corresponds to a supported enhanced duplexing capability of the first apparatus; and means for communicating with at least a second apparatus based at least in part on the supported enhanced duplexing capability of the first apparatus.

In some aspects, a control apparatus for wireless communication includes means for receiving, from a first apparatus, enhanced duplexing capability signaling that indicates a level from a plurality of levels, wherein the level corresponds to a supported enhanced duplexing capability of the first apparatus; and means for performing an action for one or more of the first apparatus or a second apparatus based at least in part on the enhanced duplexing capability signaling received from the first apparatus.

In some aspects, a first apparatus for wireless communication includes means for receiving enhanced duplexing capability signaling that indicates a level from a plurality of levels, wherein the level corresponds to a supported enhanced duplexing capability of a second apparatus; and means for communicating with the second apparatus based at least in part on the enhanced duplexing capability signaling.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
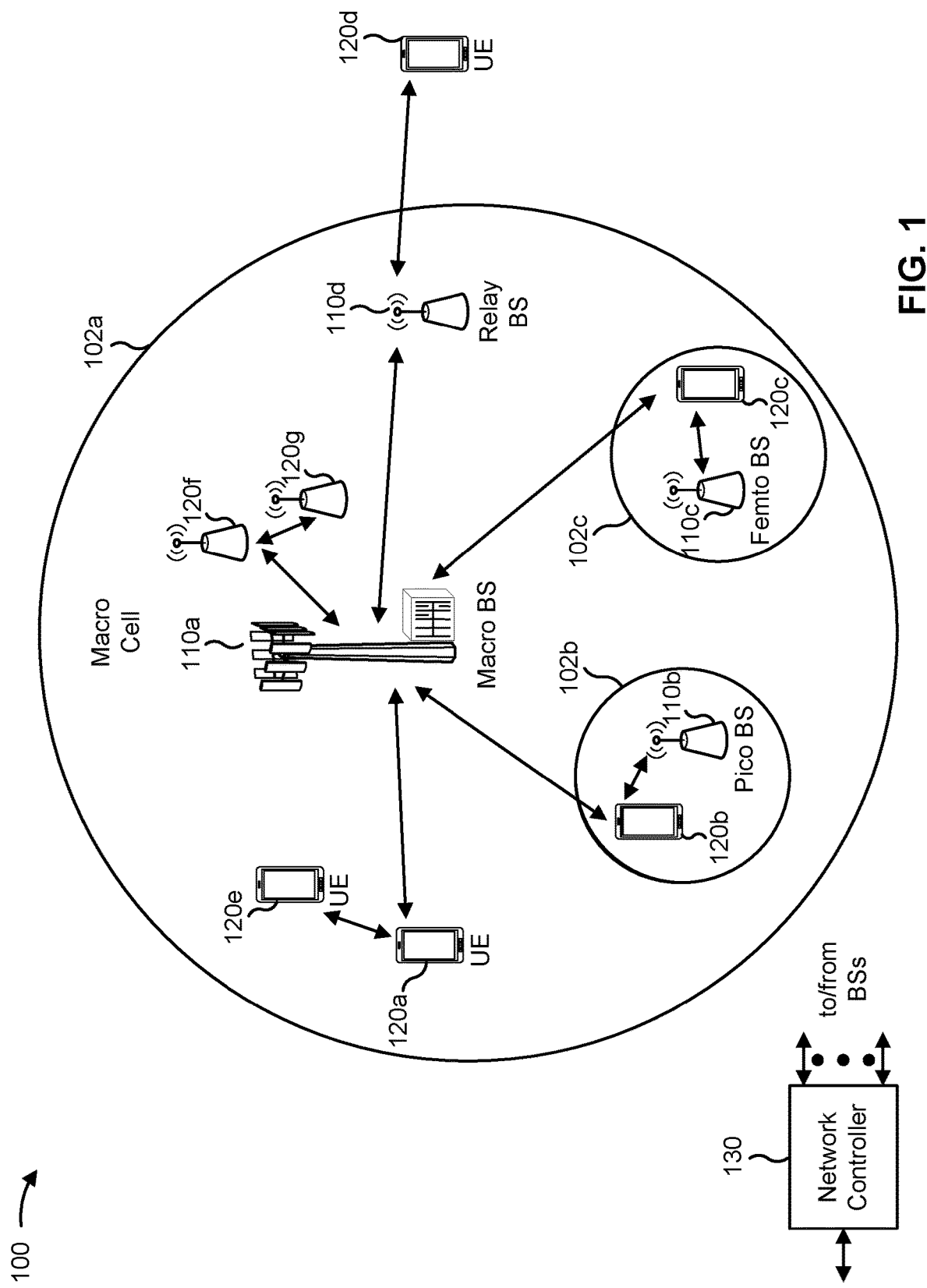
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
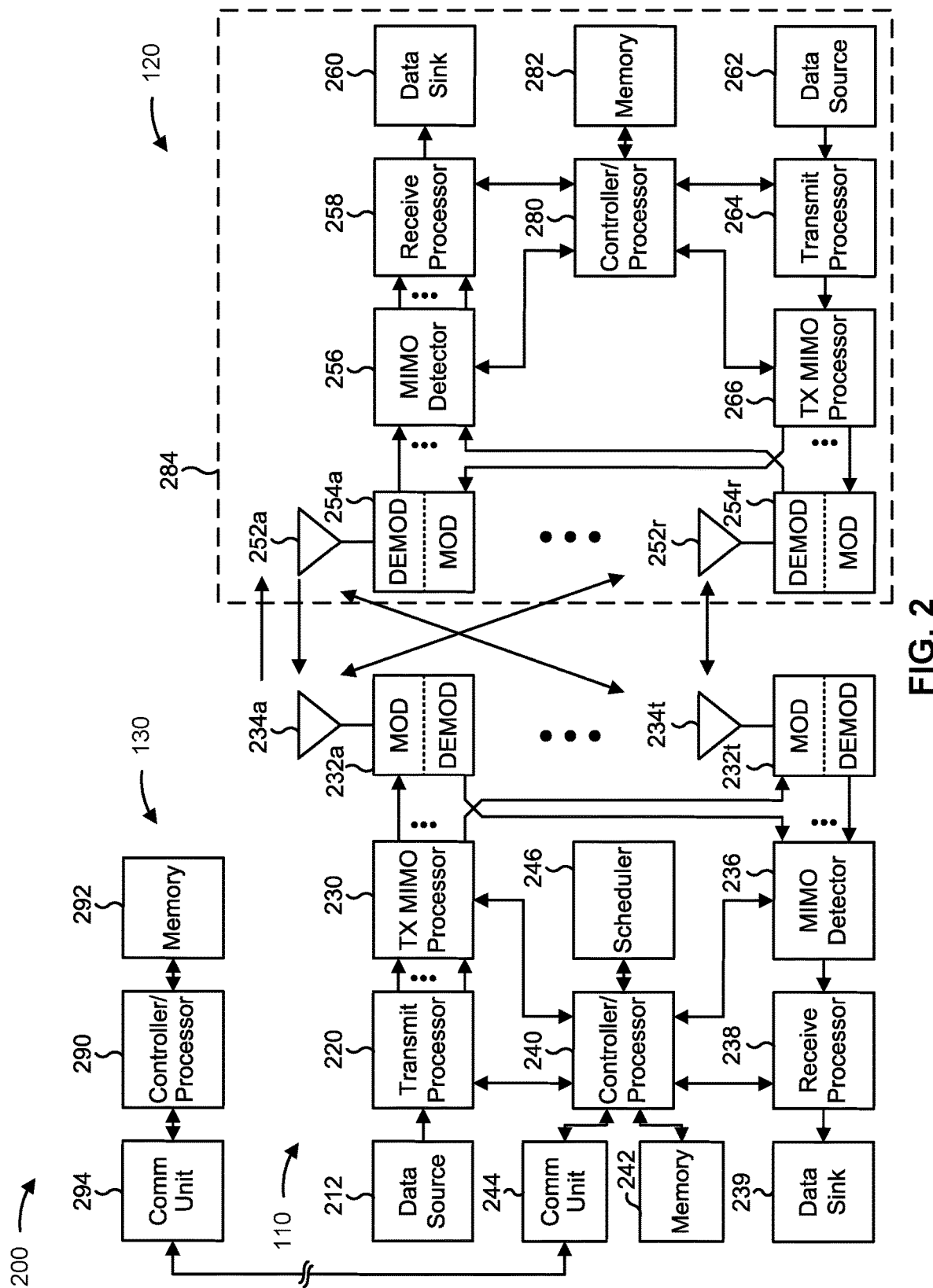
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-14).

The controller/processor 240 of the base station 110, the controller/processor 280 of the UE 120, and/or any other component(s) of FIG. 2 may perform one or more techniques associated with enhanced duplex capability signaling, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a first wireless node (e.g., a first IAB node 120f) may include means for transmitting enhanced duplexing capability signaling that indicates a level from a plurality of levels, wherein the level corresponds to a supported enhanced duplexing capability of the first wireless node, and/or means for communicating with at least a second wireless node based at least in part on the supported enhanced duplexing capability of the first wireless node. The means for the first wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, a control node (e.g., an IAB donor, such as base station 110) may include means for receiving, from a first wireless node, enhanced duplexing capability signaling that indicates a level from a plurality of levels, wherein the level corresponds to a supported enhanced duplexing capability of the first wireless node, and/or means for performing an action for one or more of the first wireless node or a second wireless node based at least in part on the enhanced duplexing capability signaling received from the first wireless node. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, a first wireless node (e.g., a first IAB node 120*f*) may include means for receiving enhanced duplexing capability signaling that indicates a level from a plurality of levels, wherein the level corresponds to a supported enhanced duplexing capability of a second wireless node, and/or means for communicating with the second wireless node based at least in part on the enhanced duplexing capability signaling. The means for the first wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
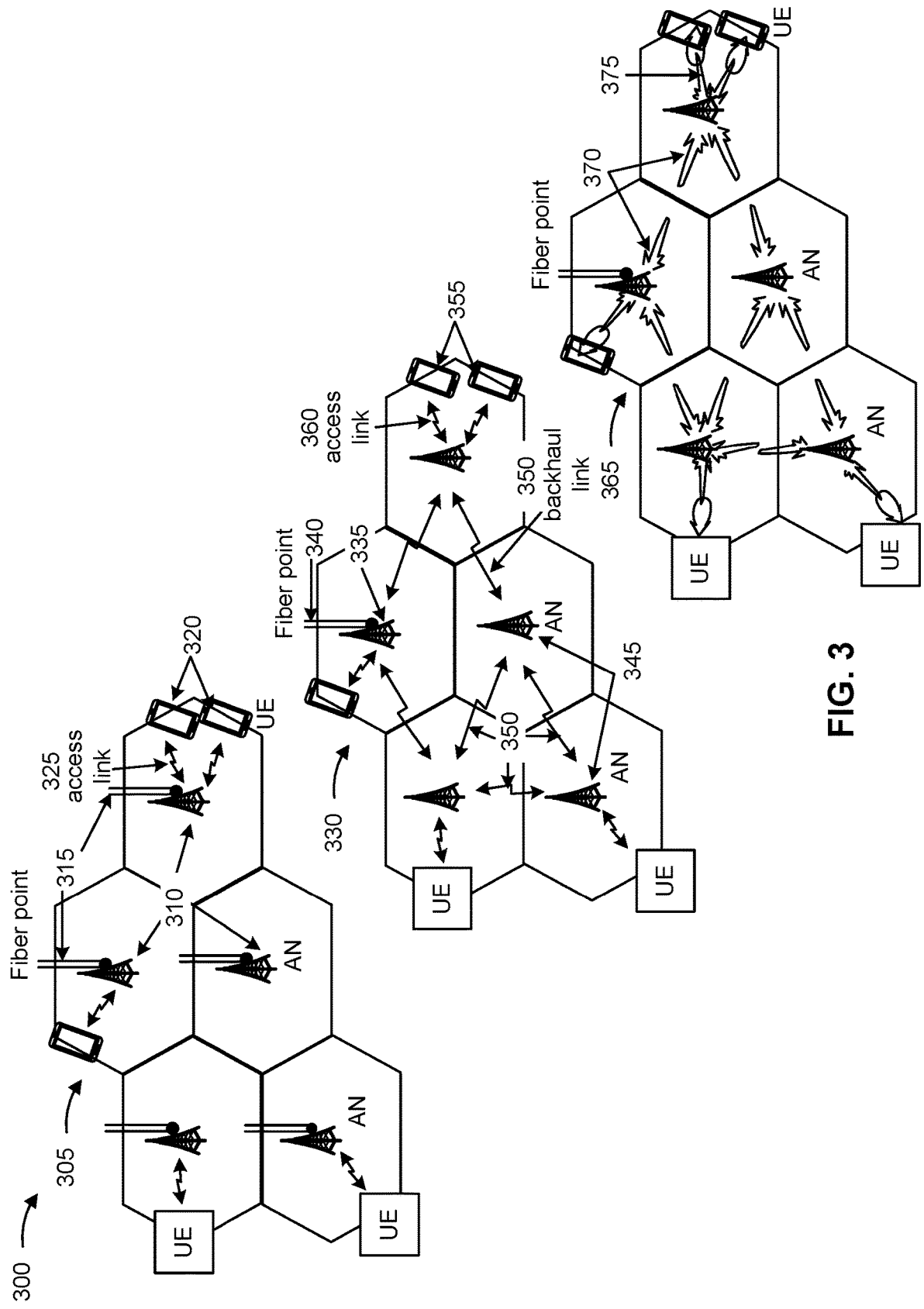
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, and/or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, and/or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
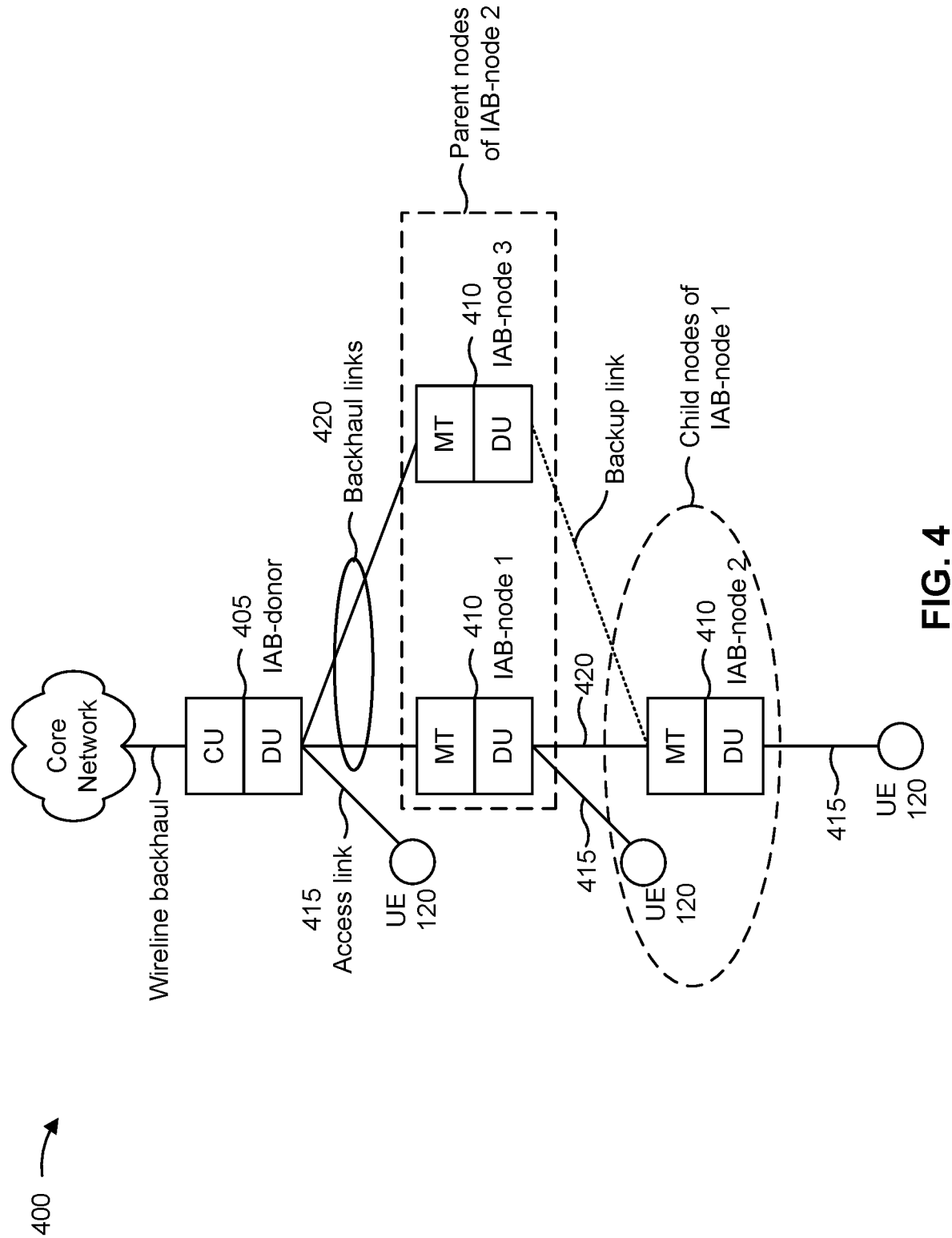
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions, and/or AMF functions. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, and/or an F1 application protocol (FLAP) message). An IAB node may function as a Layer 2 relay for traffic transported via an IAB network configured or managed by a CU.

A CU (whether associated with an IAB donor or a gNB) may perform RRC layer functions and packet data convergence protocol (PDCP) functions. A DU may act as a scheduling node that schedules child nodes of a network node associated with the DU. For example, the DU may perform radio link control (RLC), medium access control (MAC), and physical (PHY) layer functions.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Figure 5:
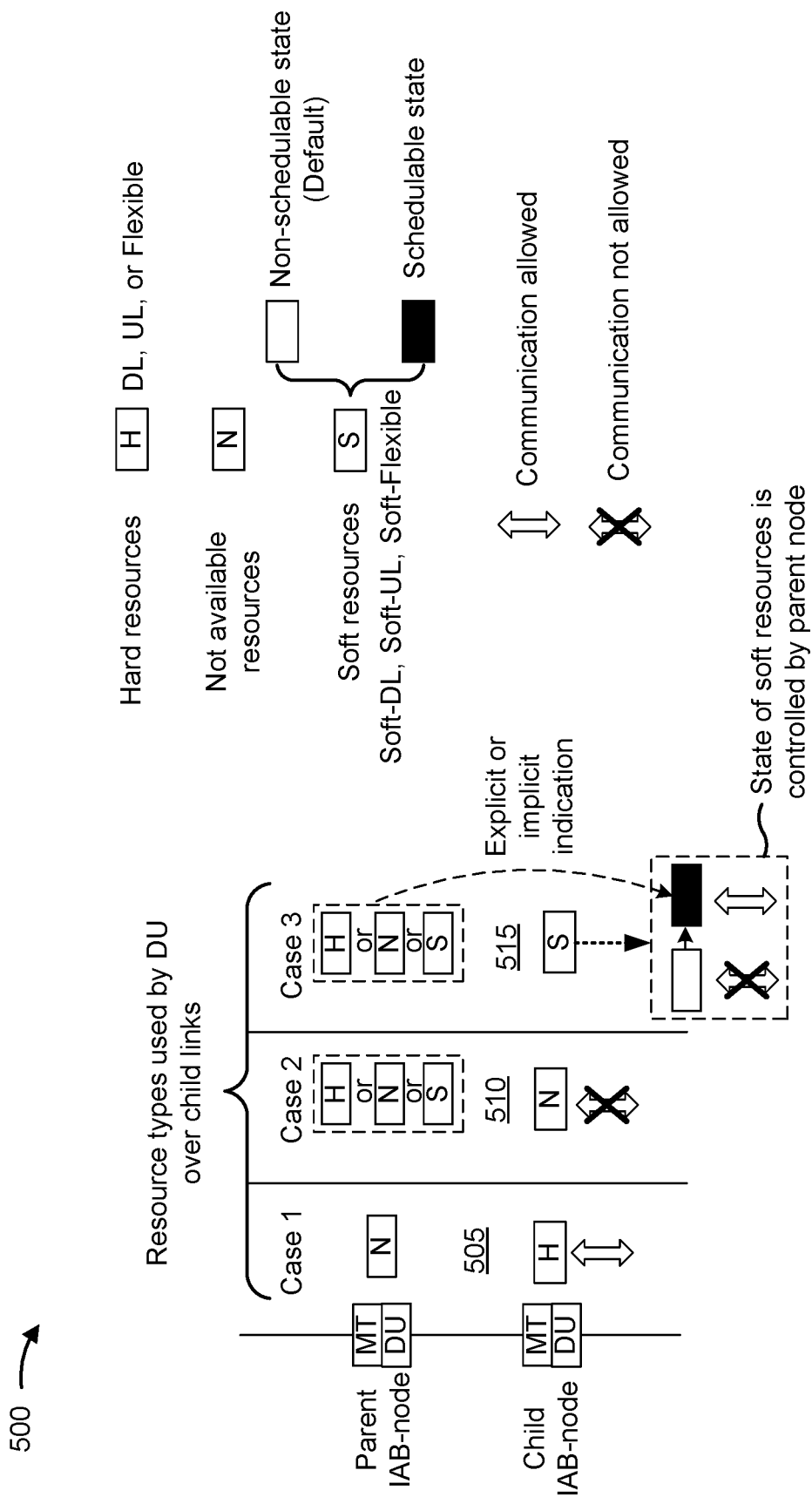
FIG. 5 is a diagram illustrating an example of resource types in an IAB network, in accordance with the present disclosure.

FIG. 5 is a diagram illustrating an example 500 of resource types in an IAB network, in accordance with the present disclosure.

In an IAB network, time domain resources (sometimes referred to as time resources) may be configured as downlink-only, uplink-only, flexible, or not available (e.g., NA, unavailable). For example, time domain resources may be configured via a DU cell resource configuration, such as a gNB-DU cell resource configuration, as described in more detail in connection with FIG. 6. When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs) (both cell defining SSBs (CD-SSBs) and non-CD-SSBs), channel state information reference signals (CSI-RSs), physical downlink control channel (PDCCH) communications, and/or physical downlink shared channel (PDSCH) communications. Examples of uplink communications include physical random access channel (PRACH) communications, physical uplink control channel (PUCCH) communications, physical uplink shared channel (PUSCH) communications, and/or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, and/or may reduce scheduling conflicts between the parent node and the child node.

As another example, and as shown by reference number 510, a time resource may be configured as not available for the child node, and may be configured as hard, soft, or not available for the parent node (e.g., depending on a network configuration, network conditions, and/or a configuration of a parent node of the parent node). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples may differ from what is described with regard to FIG. 5.

A full-duplex capability may indicate an ability to perform simultaneous transmissions and receptions. A wireless node, such as an IAB node or a UE that supports dual connectivity and/or carrier aggregation, may support simultaneous transmissions and receptions in accordance with the full-duplex capability. The wireless node may transmit capability exchange signaling to an IAB donor or a parent node to indicate the full-duplex capability of the wireless node.

An enhanced multiplexing capability may indicate an ability to perform simultaneous transmissions and/or receptions. A wireless node, such as an IAB node, may support simultaneous communications using an IAB MT and an IAB DU of the wireless node.

The wireless node may transmit capability exchange signaling to an IAB donor or a parent node to indicate the full-duplex or enhanced multiplexing capability of the wireless node. The wireless node may transmit the capability exchange signaling using F1AP messaging. The capability exchange signaling may include a binary indication, which may represent a capability of the wireless node. For example, the capability exchange signaling may include a first binary value to indicate that the full-duplex or enhanced multiplexing capability is supported at the wireless node, or the capability exchange signaling may include a second binary value to indicate that the full-duplex or enhanced multiplexing capability is not supported at the wireless node.

Figure 6:
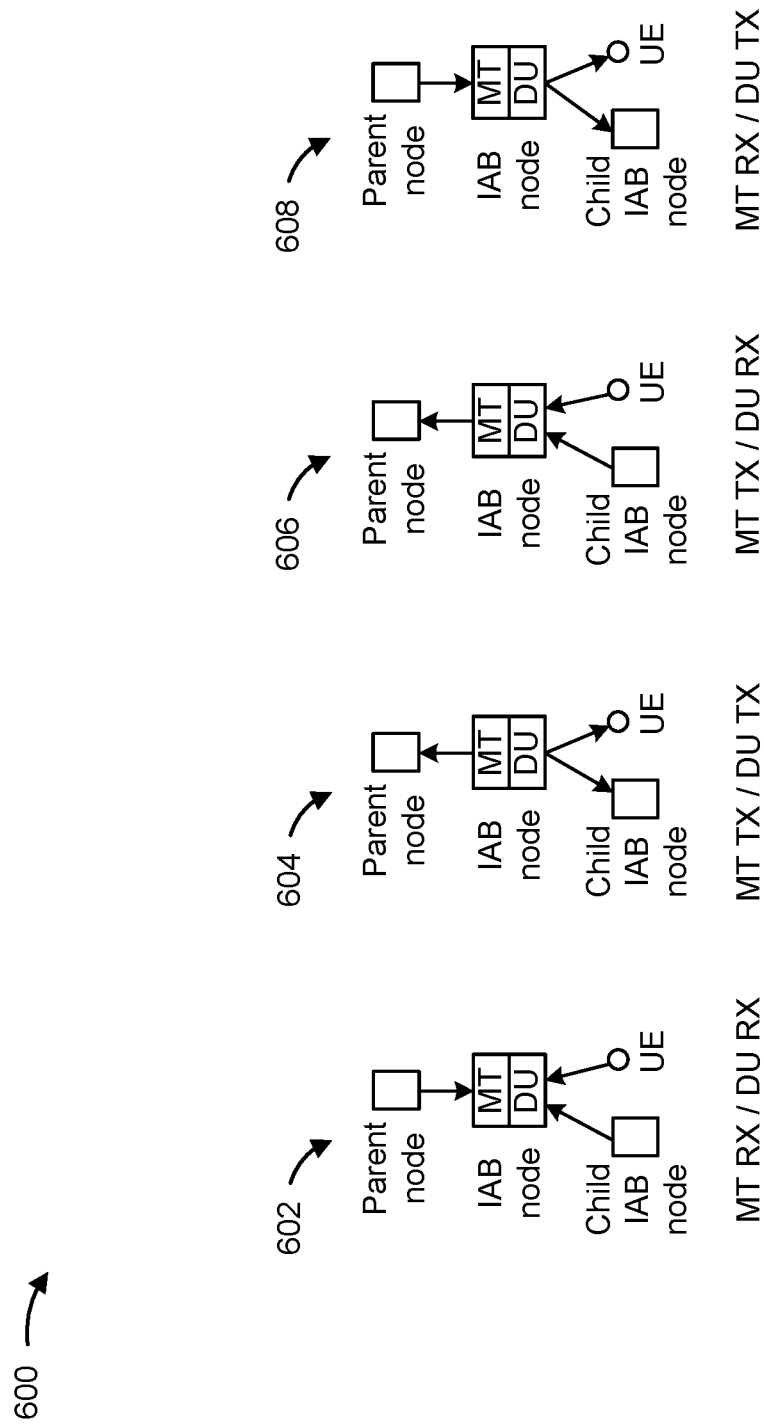
FIG. 6 is a diagram illustrating an example of simultaneous communications at an IAB node, in accordance with the present disclosure.

FIG. 6 is a diagram illustrating an example 600 of simultaneous communications at an IAB node, in accordance with the present disclosure.

An IAB node may support simultaneous transmit (TX) and/or receive (RX) operations with respect to an MT of the IAB node and a DU of the IAB node. In other words, the IAB node may support a simultaneous MT and DU operation, which may involve an MT TX/RX and/or a DU TX/RX.

As shown by reference number 602, an IAB node may perform simultaneous MT RX and DU RX operations. For example, the IAB node may perform simultaneous receptions with a parent node (e.g., an IAB donor), a child IAB node, and/or a UE.

As shown by reference number 604, an IAB node may perform simultaneous MT TX and DU TX operations. For example, the IAB node may perform simultaneous transmissions with a parent node (e.g., an IAB donor), a child IAB node, and/or a UE.

As shown by reference number 606, an IAB node may perform simultaneous MT TX and DU RX operations. For example, the IAB node may perform transmissions with a parent node (e.g., an IAB donor), and the IAB node may perform simultaneous receptions with a child IAB node and/or a UE.

As shown by reference number 608, an IAB node may perform simultaneous MT RX and DU TX operations. For example, the IAB node may perform receptions with a parent node (e.g., an IAB donor), and the IAB node may perform simultaneous transmissions with a child IAB node and/or a UE.

As indicated above, FIG. 6 is provided as an example. Other examples may differ from what is described with regard to FIG. 6.

Figure 7:
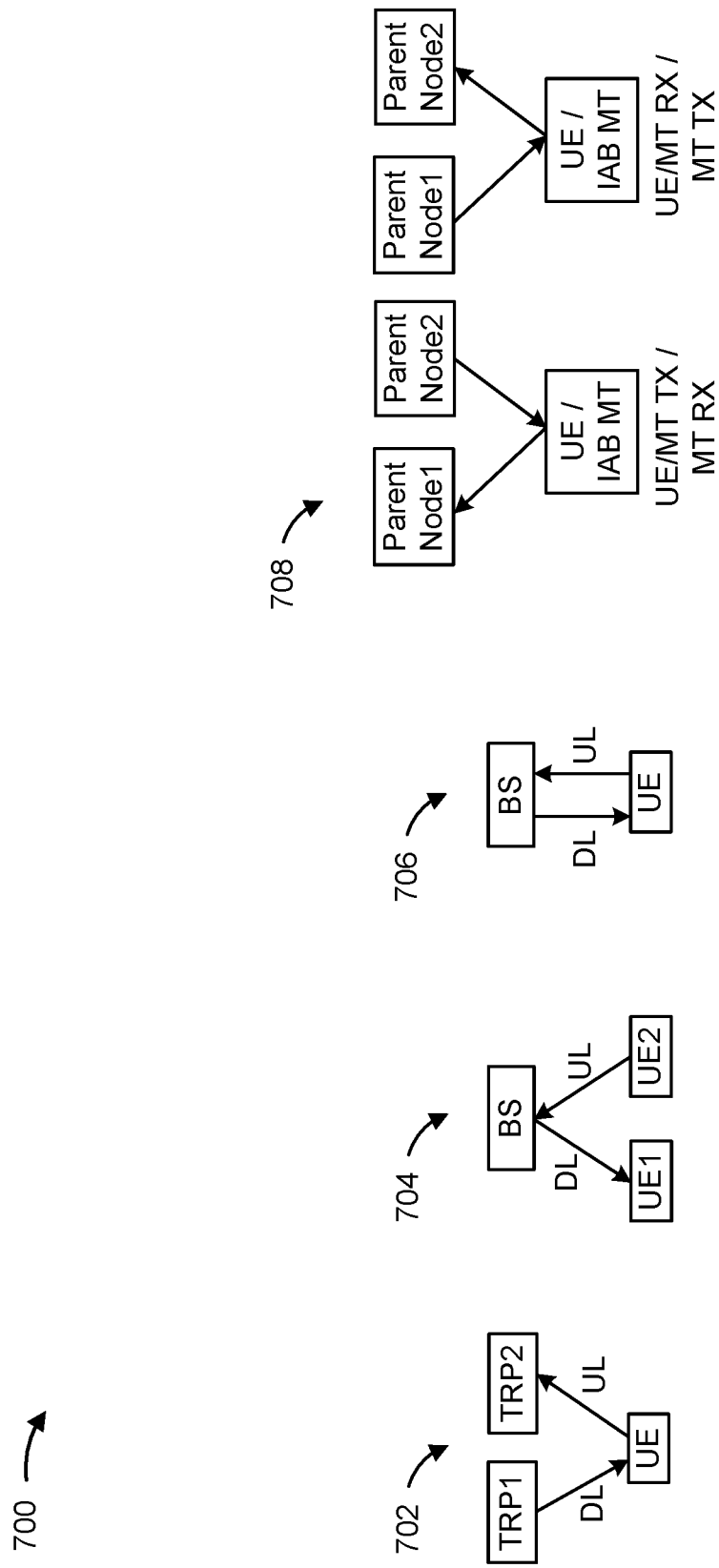
FIG. 7 is a diagram illustrating an example of full-duplex communications, in accordance with the present disclosure.

FIG. 7 is a diagram illustrating an example 700 of full-duplex communications, in accordance with the present disclosure.

As shown by reference number 702, with respect to full-duplex communications, a single UE/IAB MT may perform a reception with a first TRP via a downlink and a simultaneous transmission with a second TRP via an uplink. In some cases, two separate TRPs may be associated with a same parent node (e.g., a DU).

As shown by reference number 704, with respect to full-duplex communications, a single base station may perform a transmission with a first UE/IAB MT via a downlink and a simultaneous reception with a second UE/IAB MT via an uplink.

As shown by reference number 706, with respect to full-duplex communications, a base station may perform a transmission with a UE/IAB MT via a downlink and a simultaneous reception with the UE/IAB MT via an uplink.

As shown by reference number 708, with respect to full-duplex communications, a UE/IAB MT may perform a transmission with a first parent node via an uplink and a simultaneous reception with a second parent node via a downlink. In another example, a UE/IAB MT may perform a reception with a first parent node via a downlink and a simultaneous transmission with a second parent node via an uplink. In some cases, the UE/IAB MT may support a dual connectivity, such that the UE/IAB MT may be connected to both the first parent node and the second parent node at a same time. A first connection between the UE/IAB MT and the first parent node may be associated with a same frequency band with respect to a second connection between the UE/IAB MT and the second parent node.

As indicated above, FIG. 7 is provided as an example. Other examples may differ from what is described with regard to FIG. 7.

Full duplex operation at a wireless node may be subjected to self-interference at the wireless node. For example, a transmitted signal from the wireless node may be leaked to a receive port of the wireless node, thereby causing the self-interference. As another example, a transmitted signal from the wireless node may be reflected by an object back to a receive port of the wireless node (e.g., clutter echo), thereby causing the self-interference. In some cases, self-interference may be reduced via spatial isolation. TX and RX beams may be selected to achieve the spatial isolation (e.g. a TX-RX array isolation of 85 dB or higher may be possible for millimeter waves). Self-interference may be reduced using various TX/RX beamforming techniques, such as null-forming. Self-interference cancellation may be performed in both an analog domain and a digital domain.

A wireless node may determine whether a full-duplex operation is supportable at the wireless node or is to be enabled at the wireless node based at least in part on self-interference measurements. For example, while the wireless node is sending a signal from a first set of antennas on one or more TX beam directions, the wireless node may measure a received signal on a second set of antennas on one or more RX beam directions. The received signal may be a reflected signal or a leaked transmitted signal. The wireless node may determine whether to support or enable the full-duplex operation based at least in part on measurements of the received signal. In other words, the measurements of the received signal may correspond to the self-interference measurements. In some cases, the first set of antennas and the second set of antennas may correspond to a common set of antennas for the wireless node.

A wireless node (e.g., a UE/IAB MT) may perform the self-interference measurements without signaling or coordination with other network entities. A base station (e.g., a DU) may transmit a downlink signal to the wireless node, and the wireless node may perform a measurement of the downlink signal received on an RX port and/or antenna(s) of the wireless node. The downlink signal may be an SSB or a CSI-RS. The measurement of the downlink signal may be in terms of an RSRP, and/or an RSSI. When the wireless node is scheduled to transmit an uplink signal, such as an SRS, the wireless node may perform self-interference measurements on the RX port and/or antenna(s) of the wireless node. The wireless node may or may not provide a report of the self-interference measurements to a network. The wireless node may determine whether to support a full-duplex operation and/or perform a beam tuning based at least in part on the self-interference measurements.

A wireless node (e.g., a UE/IAB MT) may perform the self-interference measurements with involvement from the network. For example, the network may provide configurations and/or resources for the wireless node to perform the self-interference measurements. The network may configure the wireless node to provide reports indicating the self-interference measurements. The network, based at least in part on reports received from the wireless node, may determine whether a full-duplex operation is to be supported at the wireless node.

Clutter interference may be a challenge when enabling full-duplex operation using millimeter waves. Clutter interference may be interference or clutter echo resulting from surrounding objects, such as objects surrounding a wireless node that cause the interference. Clutter interference may be mitigated using TX/RX null forming in a direction of the surrounding objects that cause the interference (e.g., the direction of the clutter). In other words, TX and RX beams may be adjusted to form nulls in the direction of the surrounding objects that cause the interference. An increased TX power may be used by the wireless node to estimate an amount of interference caused by the clutter echo, as the clutter echo may be associated with an increased round trip time. The wireless node may proactively detect the clutter interference and a direction associated with the clutter interference. The direction associated with the clutter interference may be a direction that is different from current active and/or candidate TX and RX beams.

A full-duplex and/or enhanced multiplexing capability may not be static for a wireless node, but rather may depend on conditions or constraints being satisfied at the wireless node. In other words, when the conditions or constraints are satisfied at the wireless node, the wireless node may possess the full-duplex and/or enhanced multiplexing capability. The full-duplex and/or enhanced multiplexing capability of the wireless node may be a conditional capability. The conditions or constraints may be related to a limit on a maximum TX/RX power. The conditions or constraints may be related to useable beams or pairs of beams. The conditions or constraints may be related to a required timing alignment between concurrent communications. The conditions or constraints may be related to a required guard band between concurrent transmissions to reduce leakage. The conditions or constraints may be related to a maximum data rate, a modulation and coding scheme, and/or a number of supported layers. In some cases, capability exchange signaling from the wireless node may indicate the conditions or constraints along with the full-duplex and/or enhanced multiplexing capability of the wireless node.

A wireless node (e.g., a UE/IAB MT) may perform interference measurements, such as self-interference measurements when full-duplex operation is supported at the wireless node. The wireless node may perform the interference measurements to measure an amount of interference associated with concurrent communications of the wireless node. The wireless node may report a metric for one or more measurement configurations based at least in part on the interference measurements performed at the wireless node. The metric may be an RSSI, RSRP, RSRQ, signal to interference and noise ratio (SINR), and/or CQI. The one or more measurement configurations may include TX/RX beams of the wireless node, a TX power of the wireless node, and/or a timing configuration of the wireless node.

In some cases, whether the wireless node supports a full-duplex and/or enhanced multiplexing capability may depend on the interference measurements performed at the wireless node. In other cases, an efficiency associated with the full-duplex and/or enhanced multiplexing capability supported by the wireless node may depend on the interference measurements performed at the wireless node. For example, an increased level of interference may result in a less efficient full-duplex and/or enhanced multiplexing operation, whereas a reduced level of interference may result in a more efficient full-duplex and/or enhanced multiplexing operation.

Capability exchange signaling may be associated with a varying amount of signaling overhead, depending on a type of capability exchange signaling performed by the wireless node. A binary indication that indicates whether a full-duplex and/or enhanced multiplexing capability is supported at the wireless node may be associated with a reduced amount of signaling overhead. Measurement reporting that indicates an amount of interference between concurrent communications of the wireless node may be associated with an increased amount of signaling overhead. A conditional capability indication, which may indicate whether a full-duplex and/or enhanced multiplexing capability is supported when conditions or constraints are satisfied at the wireless node, may be associated with an amount of signaling overhead that is in between the binary indication and the measurement reporting.

The binary indication may be associated with the reduced amount of signaling overhead, but the binary indication may provide a limited indication of the full-duplex and/or enhanced multiplexing capability of the wireless node. The measurement reporting and/or the conditional capability indication may provide an improved indication of the full-duplex and/or enhanced multiplexing capability of the wireless node in relation to the binary indication, but the measurement reporting and/or the conditional capability indication may be associated with an increased amount of signaling overhead in relation to the binary indication.

In various aspects of techniques and apparatuses described herein, an enhanced duplexing capability signaling from a wireless node may include a non-binary indication associated with a full-duplex and/or enhanced multiplexing capability of the wireless node. The non-binary indication may be associated with an amount of signaling overhead that is in between the binary indication and the conditional capability indication. The non-binary indication may indicate a level that corresponds to a supported enhanced duplexing capability of the wireless node, where the level may be selected from a plurality of levels. In some aspects, the level indicated by the non-binary indication may correspond to a threshold of a measured metric of the wireless node. In some aspects, the level indicated by the non-binary indication may correspond to a setting used to enable the supported enhanced duplexing capability of the wireless node. In some aspects, an association between the level and the threshold or setting may be preconfigured for the wireless node or may be indicated by a control node (e.g., an IAB donor) or another wireless node. In some aspects, the level may correspond to a first quantity of configurations supported by the wireless node and a second quantity of configurations, less than or equal to the first quantity, that supports communications using an enhanced duplexing capability of the wireless node. In some aspects, the level may correspond to a ratio between a supported data rate or supported amount of traffic when the wireless node operates in an enhanced duplexing mode versus when the wireless node does not operate in the enhanced duplexing mode (e.g., a half-duplex mode).

Figure 8:
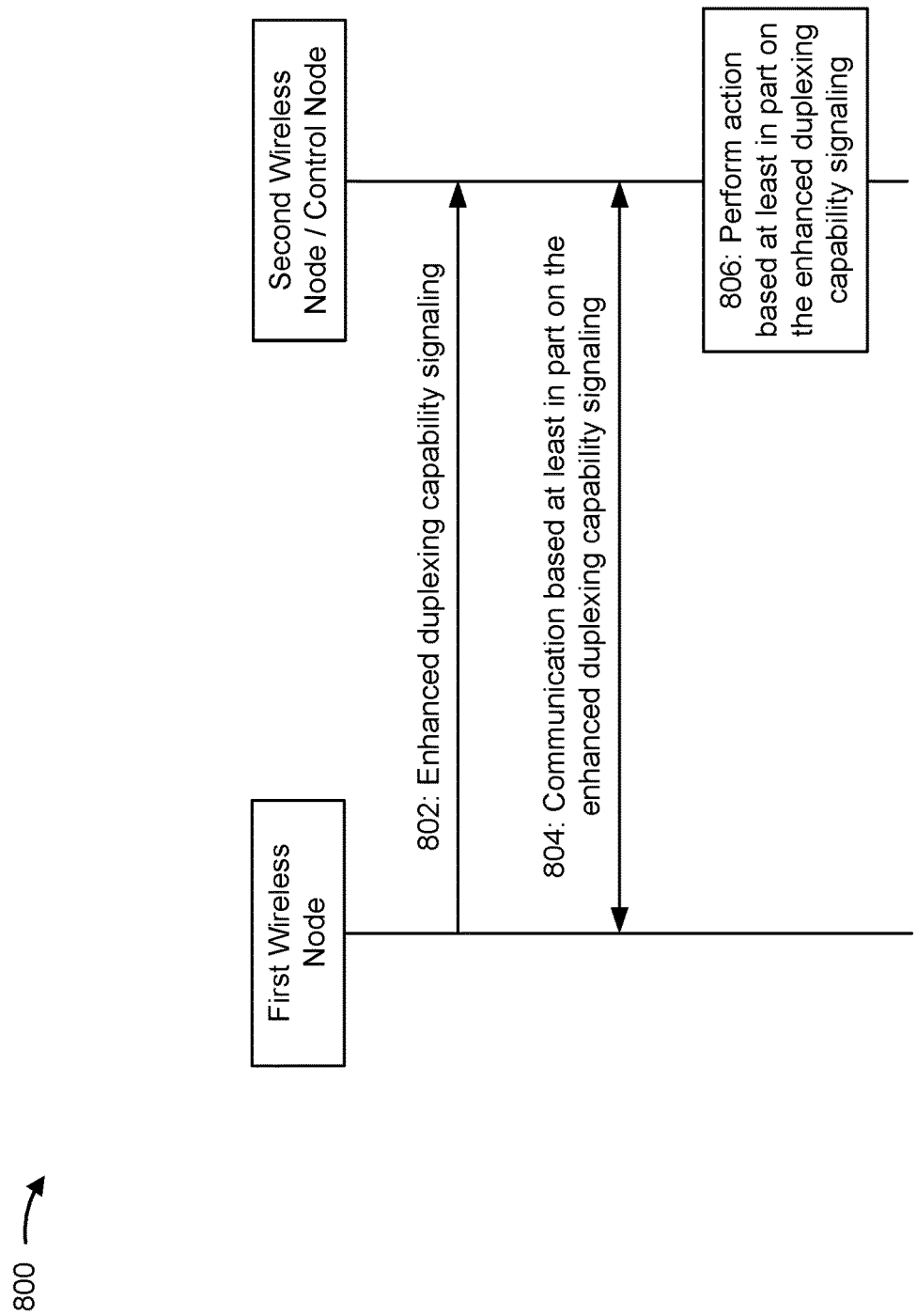
FIGS. 8-9 are diagrams illustrating examples associated with enhanced duplex capability signaling, in accordance with the present disclosure.

FIG. 8 is a diagram illustrating an example 800 associated with enhanced duplex capability signaling, in accordance with the present disclosure. As shown in FIG. 8, example 800 includes communication between a first wireless node (e.g., a first IAB node 120f), a second wireless node (e.g., a second IAB node 120g), and/or a control node (e.g., base station 110). In some aspects, the first wireless node, the second wireless node, and/or the control node may be included in a wireless network such as wireless network 100. The first wireless node, the second wireless node, and/or the control node may communicate on a wireless sidelink.

As shown by reference number 802, the first wireless node may transmit enhanced duplexing capability signaling. The enhanced duplexing capability signaling may correspond to a full-duplex capability of the first wireless node, in which simultaneous transmissions and receptions may be supported at the first wireless node. The enhanced duplexing capability signaling may correspond to a multiplexing capability of the first wireless node, in which simultaneous transmissions and/or receptions may be supported at the first wireless node.

In some aspects, the first wireless node may transmit the enhanced duplexing capability signaling to the second wireless node. The second wireless node may be a serving node of the first wireless node. The first wireless node may be a first IAB node, and the second wireless node may be a second IAB node or an IAB donor that is the serving node of the first IAB node.

In some aspects, the first wireless node may transmit the enhanced duplexing capability signaling to the control node. The control node may be an IAB donor that is a serving node of the first wireless node.

In some aspects, the first wireless node may transmit the enhanced duplexing capability signaling to the network, such as the control node. Alternatively, or additionally, the first wireless node may transmit the enhanced duplexing capability signaling to other wireless nodes, such as the second wireless node.

In some aspects, the enhanced duplexing capability signaling may indicate a level from a plurality of levels, where the level may correspond to a supported enhanced duplexing capability of the first wireless node. For example, multiple discrete levels (e.g., level 1/2/ . . . /N, or low/medium/high) may be defined by the network (e.g., the control node), where each of the discrete levels may correspond to a specific enhanced duplexing capability. The first wireless node may be capable of supporting an enhanced duplexing capability that corresponds to a level i, where the level i is selected from the multiple discrete levels that are defined by the network. The first wireless node may report the level i associated with the enhanced duplexing capability of the first wireless node to the network and/or other wireless nodes.

In some aspects, the level selected from the plurality of levels may correspond to a threshold of a measured metric. The measured metric may be associated with a received power, a received quality, an amount of interference, an amount of self-interference, and/or an amount of leakage. In some aspects, an association between the level and the threshold may be preconfigured for the first wireless node or may be indicated to the first wireless node by the control node or the second wireless node.

In some aspects, different levels may be associated with different thresholds of the measured metric. The measured metric may be an RSRP, RSSI, RSRQ, signal-to-interference ratio (SIR), and/or CQI. As an example, when a measured metric is less than a first threshold, a first level may be selected to indicate the supported enhanced duplexing capability of the first wireless node. As another example, when a measured metric is greater than the first threshold and less than a second threshold, a second level may be selected to indicate the supported enhanced duplexing capability of the first wireless node. The first level, and/or the second level may be indicated in the enhanced duplexing capability signaling transmitted by the first wireless node.

In some aspects, the level selected from the plurality of levels may correspond to a setting used to enable the supported enhanced duplexing capability of the first wireless node. In some aspects, an association between the level and the setting for enabling the supported enhanced duplexing capability may be preconfigured for the first wireless node or may be indicated to the first wireless node by the control node or the second wireless node.

In some aspects, different levels may be associated with different settings used to support the enhanced duplexing capability of the first wireless node. The different settings may correspond to thresholds for maximum TX powers, thresholds for minimum and/or maximum RX powers, thresholds for supported data rates, thresholds for supported modulation and coding schemes, thresholds for supported numbers of layers, thresholds for amounts of desired guard bands, and/or thresholds for amounts of desired time alignment. In other words, a level included in the enhanced duplexing capability signaling may correspond to a setting used to support the enhanced duplexing capability, and the level may be selected based at least in part on a maximum TX power, a minimum/maximum RX power, a supported data rate, a supported modulation and coding scheme, a supported number of layers, an amount of desired guard bands, and/or an amount of desired time alignment satisfying corresponding thresholds.

In some aspects, the level selected from the plurality of levels may correspond to a level of efficiency associated with an enhanced duplexing capability that is supported at the first wireless node. For example, the level may indicate a percentage of configurations of the first wireless node that support the enhanced duplexing capability, data rates that may be achieved by the first wireless node supporting the enhanced duplexing capability, and/or an amount of traffic that may be processed by the first wireless node supporting the enhanced duplexing capability.

In some aspects, the level may correspond to a first quantity of configurations supported by the first wireless node and a second quantity of configurations, less than or equal to the first quantity, that supports communications using the enhanced duplexing capability of the first wireless node.

As an example, the first wireless node may be able to communicate using N different configurations, and k configurations of the N different configurations may support communicating using the enhanced duplexing capability of the first wireless node. In this example, the level included in the enhanced duplexing capability signaling may be an efficiency level defined by (k/N).

As an example, the first wireless node may be able to communicate using N beams, or in N directions, or with N other wireless nodes. The first wireless node may support the enhanced duplexing capability ink beams, or in k directions, or with k other wireless nodes, where k is a subset of N. In this example, the level included in the enhanced duplexing capability signaling may be an efficiency level defined by (k/N) with respect to the beams, the directions, or the other wireless nodes.

As an example, an IAB DU of the first wireless node may be able to support simultaneous communication with a collocated IAB MT of the first wireless node for directions associated with a number of SSBs from a maximum number of SSBs (Nmax). In this example, the level included in the enhanced duplexing capability signaling may be an efficiency level defined by the number of SSBs and associated directions in relation to the maximum number of SSBs.

In some aspects, the level may correspond to a ratio between a supported data rate of the first wireless node when operating in an enhanced duplexing mode (e.g., a full-duplex mode or an enhanced multiplexing mode) and a supported data rate of the first wireless node when not operating in the enhanced duplexing mode (e.g., a half-duplex mode). As an example, the level may correspond to a peak or average data rate that the first wireless node may support using the enhanced duplexing capability in relation to a peak or average data rate the first wireless node may achieve when operating in the half-duplex mode.

In some aspects, the level may correspond to a ratio between a supported amount of traffic of the first wireless node when operating in the enhanced duplexing mode and a supported amount of traffic of the first wireless node when not operating in the enhanced duplexing mode (e.g., a half-duplex mode).

As an example, the first wireless node may determine a total, peak, and/or average amount of traffic that the first wireless node may support using the enhanced duplexing capability. The first wireless device may determine the total, peak, and/or average amount of traffic based at least in part on a number of TX/RX beams, a number of child nodes, a traffic demand of the child nodes, and/or a traffic load for a number of directions. The first wireless device may determine a ratio between the total, peak, and/or average amount of traffic using the enhanced duplexing capability and a total, peak, and/or average amount of traffic when operating in the half-duplex mode. The first wireless device may report the ratio to the control node and/or the second wireless node. In this example, the level included in the enhanced duplexing capability signaling may correspond to the amount of traffic the first wireless node may support using the enhanced duplexing capability in relation to the amount of traffic the first wireless node may process when operating in the half-duplex mode.

In some aspects, the enhanced duplexing capability signaling from the first wireless node may indicate a single level corresponding to a single threshold of a measured metric. The single threshold may be associated with a received power, a received quality, an amount of interference, an amount of self-interference, an amount of leakage, and/or a supported data rate. The single threshold may correspond to another requirement for supporting the enhanced duplexing capability at the first wireless node, such as a lack of configuration for a time alignment, and/or a lack of configuration for an additional guard band. In this example, the network (e.g., the control node, such as an IAB donor) may configure a single threshold value to the first wireless node. The enhanced duplexing capability signaling may be a binary capability indication based at least in part on the single threshold.

As shown by reference number 804, the first wireless node may receive a communication based at least in part on the enhanced duplexing capability signaling. The first wireless node may receive the communication from the control node based at least in part on the enhanced duplexing capability signaling Additionally, or alternatively, the first wireless node may receive the communication from the second wireless node based at least in part on the enhanced duplexing capability signaling.

As shown by reference number 806, the control node and/or the second wireless node may perform an action based at least in part on the enhanced duplexing capability signaling received from the first wireless node.

In some aspects, the control node may perform the action of determining an operating mode for the first wireless node and/or the second wireless node. In some aspects, the control node may perform the action of allocating resources for the first wireless node and/or the second wireless node. In some aspects, the control node may perform the action of performing scheduling for the first wireless node and/or the second wireless node. In some aspects, the control node may perform the action of determining a time division duplex configuration for the first wireless node and/or the second wireless node. In some aspects, the control node may perform the action of managing a topology for the first wireless node and/or the second wireless node. In some aspects, the control node may the first wireless node and/or the second wireless node. In some aspects, the control node may perform the action of managing a handover for the first wireless node and/or the second wireless node. In some aspects, the control node may perform the action of determining a dual connectivity configuration or a carrier aggregation configuration for the first wireless node and/or the second wireless node.

In some aspects, the network (the control node, such as an IAB donor) may use the enhanced duplexing capability signaling when determining the operating node, allocating resources, performing scheduling, determining a time division duplex configuration, performing routing management, perform handover (mobility) management, and/or determining a carrier aggregation or dual connectivity configuration.

As indicated above, FIG. 8 is provided as an example. Other examples may differ from what is described with regard to FIG. 8.

Figure 9:
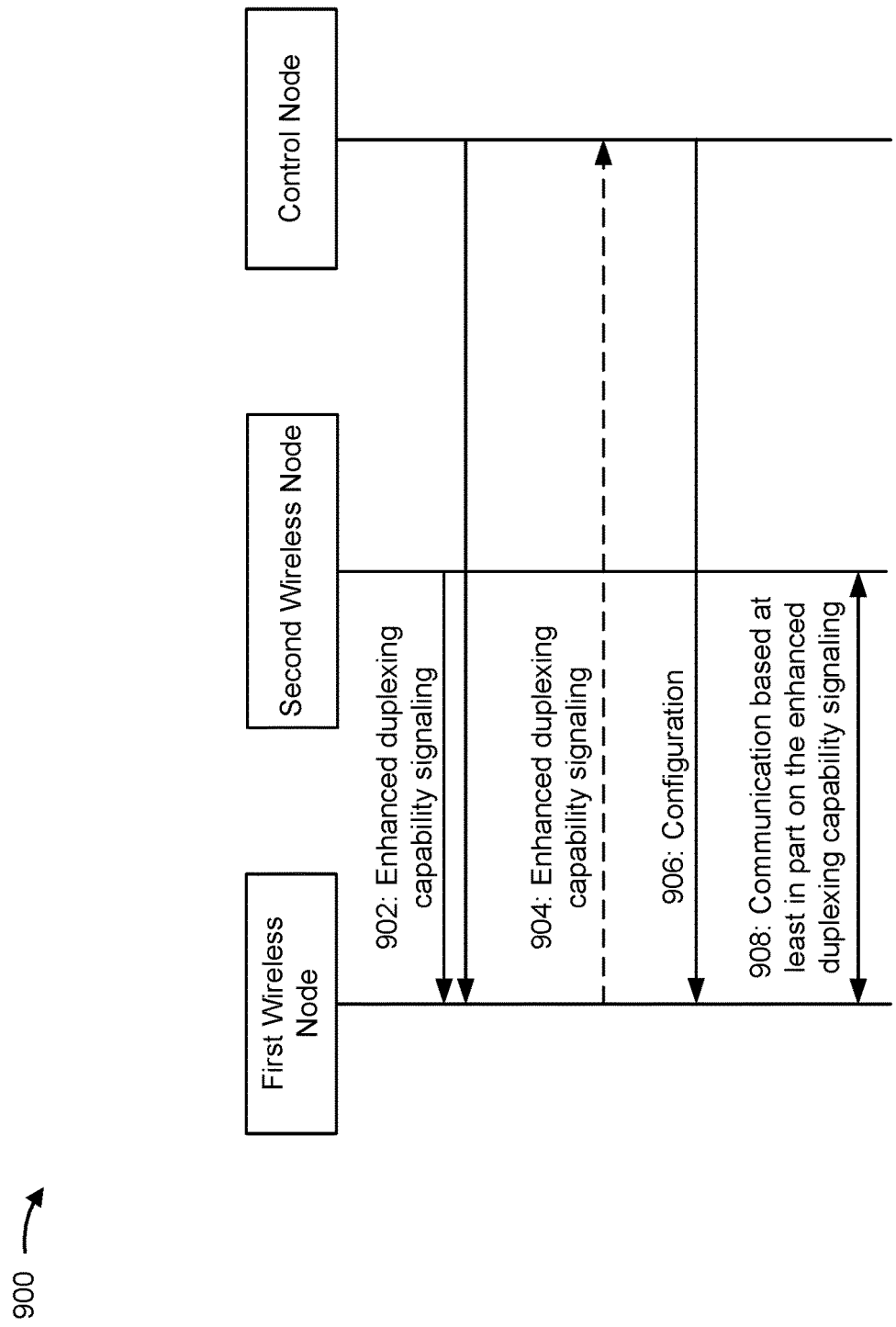

FIG. 9 is a diagram illustrating an example 900 associated with enhanced duplex capability signaling, in accordance with the present disclosure. As shown in FIG. 9, example 900 includes communication between a first wireless node (e.g., a first IAB node 120f), a second wireless node (e.g., a second IAB node 120g), and a control node (e.g., base station 110). In some aspects, the first wireless node, the second wireless node, and the control node may be included in a wireless network such as wireless network 100. The first wireless node, the second wireless node, and the control node may communicate on a wireless sidelink.

As shown by reference number 902, the first wireless node may receive enhanced duplexing capability signaling that indicates a level from a plurality of levels. The level may correspond to a supported enhanced duplexing capability of the second wireless node. The first wireless node may receive the enhanced duplexing capability signaling from the second wireless node or the control node. In some aspects, the first wireless node may receive the enhanced duplexing capability signaling from a third wireless node.

As shown by reference number 904, the first wireless node may forward the enhanced duplexing capability signaling to the control node and/or the third wireless node. For example, when the first wireless node receives the enhanced duplexing capability signaling from the second wireless node, upon receipt of the enhanced duplexing capability signaling, the first wireless node may transmit the enhanced duplexing capability signaling to the control node and/or the third node.

As shown by reference number 906, the first wireless node may receive a configuration from the control node. The configuration may include scheduling information and/or a resource allocation for the first wireless node.

As shown by reference number 908, the first wireless node may communicate with the second wireless node based at least in part on the enhanced duplexing capability signaling and the configuration (e.g., the scheduling information and/or the resource allocation) received from the control node.

As indicated above, FIG. 9 is provided as an example. Other examples may differ from what is described with regard to FIG. 9.

Figure 10:
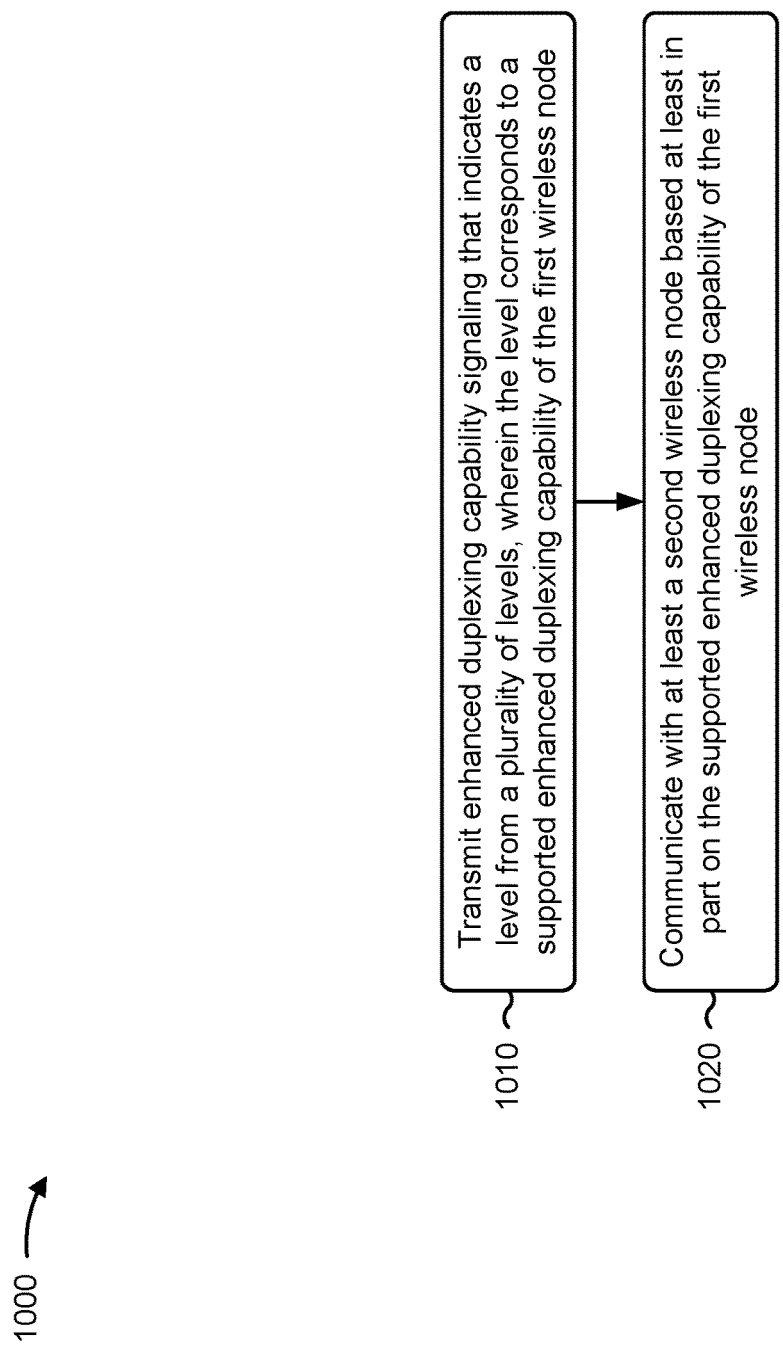
FIGS. 10-12 are diagrams illustrating example processes associated with enhanced duplex capability signaling, in accordance with the present disclosure.

FIG. 10 is a diagram illustrating an example process 1000 performed, for example, by a first wireless node, in accordance with the present disclosure. Example process 1000 is an example where the first wireless node (e.g., a first IAB node 120f) performs operations associated with enhanced duplexing capability signaling.

As shown in FIG. 10, in some aspects, process 1000 may include transmitting enhanced duplexing capability signaling that indicates a level from a plurality of levels, wherein the level corresponds to a supported enhanced duplexing capability of the first wireless node (block 1010). For example, the first wireless node (e.g., using transmission component 1304, depicted in FIG. 13) may transmit enhanced duplexing capability signaling that indicates a level from a plurality of levels, wherein the level corresponds to a supported enhanced duplexing capability of the first wireless node, as described above by reference number 802.

As further shown in FIG. 10, in some aspects, process 1000 may include communicating with at least a second wireless node based at least in part on the supported enhanced duplexing capability of the first wireless node (block 1020). For example, the first wireless node (e.g., using transmission component 1304, depicted in FIG. 13) may communicate with at least a second wireless node based at least in part on the supported enhanced duplexing capability of the first wireless node, as described above by reference number 804.

Process 1000 may include additional aspects, such as any single aspect or any combination of aspects described below and/or in connection with one or more other processes described elsewhere herein.

In a first aspect, transmitting the enhanced duplexing capability signaling comprises transmitting the enhanced duplexing capability signaling to the second wireless node. In a second aspect, alone or in combination with the first aspect, the second wireless node is a serving node of the first wireless node. In a third aspect, alone or in combination with one or more of the first and second aspects, the first wireless node is a first IAB node, and the second wireless node is a second IAB node or an IAB donor that is the serving node of the first IAB node.

In a fourth aspect, alone or in combination with one or more of the first through third aspects, transmitting the enhanced duplexing capability signaling comprises transmitting the enhanced duplexing capability signaling to a control node. In a fifth aspect, alone or in combination with one or more of the first through fourth aspects, the control node is an IAB donor of the first wireless node. In a sixth aspect, alone or in combination with one or more of the first through fifth aspects, the level corresponds to a threshold of a measured metric, wherein an association between the level and the threshold is preconfigured for the first wireless node, or the association is indicated to the first wireless node by a control node or the second wireless node.

In a seventh aspect, alone or in combination with one or more of the first through sixth aspects, the measured metric is associated with a received power, a received quality, an amount of interference, an amount of self-interference, or an amount of leakage. In an eighth aspect, alone or in combination with one or more of the first through seventh aspects, the level corresponds to a setting used to enable the supported enhanced duplexing capability of the first wireless node, wherein an association between the level and the setting for enabling the supported enhanced duplexing capability is preconfigured for the first wireless node, or the association is indicated to the first wireless node by a control node or the second wireless node.

In a ninth aspect, alone or in combination with one or more of the first through eighth aspects, the level corresponds to a first quantity of configurations supported by the first wireless node and a second quantity of configurations, less than or equal to the first quantity, that supports communications using an enhanced duplexing capability of the first wireless node. In a tenth aspect, alone or in combination with one or more of the first through ninth aspects, the level corresponds to a ratio between a supported data rate of the first wireless node when operating in an enhanced duplexing mode and a supported data rate of the first wireless node when not operating in the enhanced duplexing mode.

In an eleventh aspect, alone or in combination with one or more of the first through tenth aspects, not operating in the enhanced duplexing mode is associated with operating in a half-duplex mode. In a twelfth aspect, alone or in combination with one or more of the first through eleventh aspects, the level corresponds to a ratio between a supported amount of traffic of the first wireless node when operating in an enhanced duplexing mode and a supported amount of traffic of the first wireless node when not operating in the enhanced duplexing mode. In a thirteenth aspect, alone or in combination with one or more of the first through twelfth aspects, not operating in the enhanced duplexing mode is associated with operating in a half-duplex mode.

In a fourteenth aspect, alone or in combination with one or more of the first through thirteenth aspects, the enhanced duplexing capability signaling indicates a single level corresponding to a single threshold of a measured metric, and the single threshold is associated with a received power, a received quality, an amount of interference, an amount of self-interference, an amount of leakage, or a supported data rate. In a fifteenth aspect, alone or in combination with one or more of the first through fourteenth aspects, the enhanced duplexing capability signaling indicates a single level corresponding to a single threshold of a measured metric, and the single threshold is associated with a lack of time alignment or a lack of guard band associated with the supported enhanced duplexing capability of the first wireless node.

In a sixteenth aspect, alone or in combination with one or more of the first through fifteenth aspects, the enhanced duplexing capability signaling corresponds to a full-duplex capability of the first wireless node. In a seventeenth aspect, alone or in combination with one or more of the first through sixteenth aspects, the enhanced duplexing capability signaling corresponds to a multiplexing capability of the first wireless node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
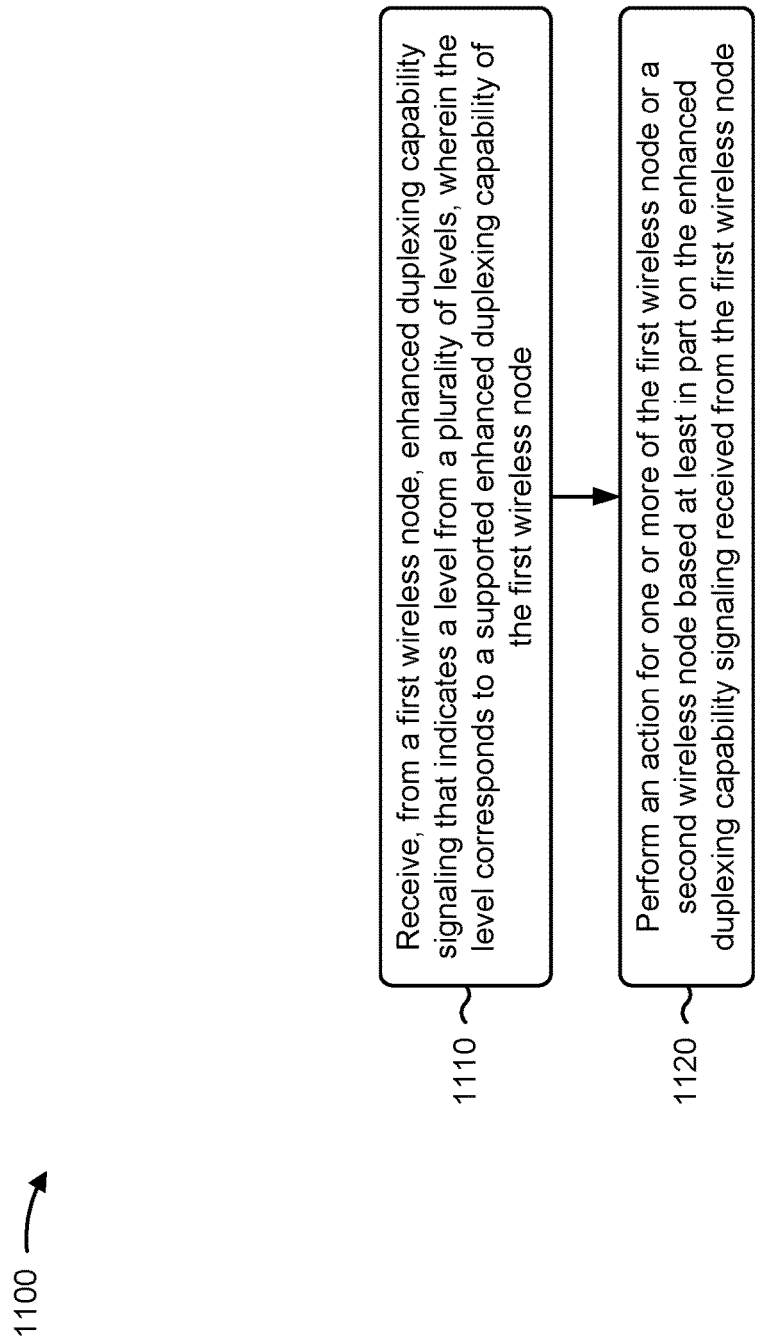

FIG. 11 is a diagram illustrating an example process 1100 performed, for example, by a control node, in accordance with the present disclosure. Example process 1100 is an example where the control node (e.g., an IAB donor, such as base station 110) performs operations associated with enhanced duplexing capability signaling.

As shown in FIG. 11, in some aspects, process 1100 may include receiving, from a first wireless node, enhanced duplexing capability signaling that indicates a level from a plurality of levels, wherein the level corresponds to a supported enhanced duplexing capability of the first wireless node (block 1110). For example, the control node (e.g., using reception component 1402, depicted in FIG. 14) may receive, from a first wireless node, enhanced duplexing capability signaling that indicates a level from a plurality of levels, wherein the level corresponds to a supported enhanced duplexing capability of the first wireless node, as described above by reference number 802.

As further shown in FIG. 11, in some aspects, process 1100 may include performing an action for one or more of the first wireless node or a second wireless node based at least in part on the enhanced duplexing capability signaling received from the first wireless node (block 1120). For example, the control node (e.g., using action performance component 1408, depicted in FIG. 14) may perform an action for one or more of the first wireless node or a second wireless node based at least in part on the enhanced duplexing capability signaling received from the first wireless node, as described above by reference number 806.

Process 1100 may include additional aspects, such as any single aspect or any combination of aspects described below and/or in connection with one or more other processes described elsewhere herein.

In a first aspect, the control node is an IAB donor of the first wireless node, the first wireless node is a first IAB node, and the second wireless node is a second IAB node. In a second aspect, alone or in combination with the first aspect, the level corresponds to a threshold of a measured metric, wherein an association between the level and the threshold is preconfigured for the first wireless node, or the association is indicated to the first wireless node by the control node or the second wireless node, and the measured metric is associated with a received power, a received quality, an amount of interference, an amount of self-interference, or an amount of leakage.

In a third aspect, alone or in combination with one or more of the first and second aspects, the level corresponds to a setting used to enable the supported enhanced duplexing capability of the first wireless node, wherein an association between the level and the setting for enabling the supported enhanced duplexing capability is preconfigured for the first wireless node, or the association is indicated to the first wireless node by the control node or the second wireless node. In a fourth aspect, alone or in combination with one or more of the first through third aspects, the level corresponds to a first quantity of configurations supported by the first wireless node and a second quantity of configurations, less than or equal to the first quantity, that supports communications using an enhanced duplexing capability of the first wireless node.

In a fifth aspect, alone or in combination with one or more of the first through fourth aspects, the level corresponds to a ratio between a supported data rate of the first wireless node when operating in an enhanced duplexing mode and a supported data rate of the first wireless node when not operating in the enhanced duplexing mode, and not operating in the enhanced duplexing mode is associated with operating in a half-duplex mode. In a sixth aspect, alone or in combination with one or more of the first through fifth aspects, the level corresponds to a ratio between a supported amount of traffic of the first wireless node when operating in an enhanced duplexing mode and a supported amount of traffic of the first wireless node when not operating in the enhanced duplexing mode, and not operating in the enhanced duplexing mode is associated with operating in a half-duplex mode.

In a seventh aspect, alone or in combination with one or more of the first through sixth aspects, the enhanced duplexing capability signaling indicates a single level corresponding to a single threshold of a measured metric, and the single threshold is associated with a received power, a received quality, an amount of interference, an amount of self-interference, an amount of leakage, or a supported data rate. In an eighth aspect, alone or in combination with one or more of the first through seventh aspects, the enhanced duplexing capability signaling indicates a single level corresponding to a single threshold of a measured metric, and the single threshold is associated with a lack of time alignment or a lack of guard band associated with the supported enhanced duplexing capability of the first wireless node.

In a ninth aspect, alone or in combination with one or more of the first through eighth aspects, performing the action for one or more of the first wireless node or the second wireless node comprises one or more of determining an operating mode for one or more of the first wireless node or the second wireless node, allocating resources for one or more of the first wireless node or the second wireless node, performing scheduling for one or more of the first wireless node or the second wireless node, determining a time division duplex configuration for one or more of the first wireless node or the second wireless node, managing a topology for one or more of the first wireless node or the second wireless node, managing a routing for one or more of the first wireless node or the second wireless node, managing a handover for one or more of the first wireless node or the second wireless node, or determining a dual connectivity configuration or a carrier aggregation configuration for one or more of the first wireless node or the second wireless node.

In a tenth aspect, alone or in combination with one or more of the first through ninth aspects, the enhanced duplexing capability signaling corresponds to a full-duplex capability of the first wireless node. In an eleventh aspect, alone or in combination with one or more of the first through tenth aspects, the enhanced duplexing capability signaling corresponds to a multiplexing capability of the first wireless node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:

FIG. 12 is a diagram illustrating an example process 1200 performed, for example, by a first wireless node, in accordance with the present disclosure. Example process 1200 is an example where the first wireless node (e.g., a first IAB node 120f) performs operations associated with enhanced duplexing capability signaling.

As shown in FIG. 12, in some aspects, process 1200 may include receiving enhanced duplexing capability signaling that indicates a level from a plurality of levels, wherein the level corresponds to a supported enhanced duplexing capability of a second wireless node (block 1210). For example, the first wireless node (e.g., using reception component 1302, depicted in FIG. 13) may receive enhanced duplexing capability signaling that indicates a level from a plurality of levels, wherein the level corresponds to a supported enhanced duplexing capability of a second wireless node, as described above by reference number 902.

As further shown in FIG. 12, in some aspects, process 1200 may include communicating with the second wireless node based at least in part on the enhanced duplexing capability signaling (block 1220). For example, the first wireless node (e.g., using transmission component 1304, depicted in FIG. 13) may communicate with the second wireless node based at least in part on the enhanced duplexing capability signaling, as described above by reference number 908.

Process 1200 may include additional aspects, such as any single aspect or any combination of aspects described below and/or in connection with one or more other processes described elsewhere herein.

In a first aspect, receiving the enhanced duplexing capability signaling comprises receiving the enhanced duplexing capability signaling from the second wireless node. In a second aspect, alone or in combination with the first aspect, receiving the enhanced duplexing capability signaling comprises receiving the enhanced duplexing capability signaling from a control node or a third wireless node. In a third aspect, alone or in combination with one or more of the first and second aspects, process 1200 includes forwarding the enhanced duplexing capability signaling received from the second wireless node to a control node or a third wireless node.

In a fourth aspect, alone or in combination with one or more of the first through third aspects, communicating with the second wireless node comprises communicating with the second wireless node based at least in part on a configuration received from a control node, wherein the configuration includes one or more of scheduling information or a resource allocation. In a fifth aspect, alone or in combination with one or more of the first through fourth aspects, the first wireless node is a first IAB node, and the second wireless node is a second IAB node.

In a sixth aspect, alone or in combination with one or more of the first through fifth aspects, the level corresponds to a threshold of a measured metric, wherein an association between the level and the threshold is preconfigured for the second wireless node, or is indicated to the second wireless node by the first wireless node, and the measured metric is associated with a received power, a received quality, an amount of interference, an amount of self-interference, or an amount of leakage.

In a seventh aspect, alone or in combination with one or more of the first through sixth aspects, the level corresponds to a setting used to enable the supported enhanced duplexing capability of the second wireless node, wherein an association between the level and the setting for enabling the supported enhanced duplexing capability is preconfigured for the second wireless node, or the association is indicated to the second wireless node by the first wireless node. In an eighth aspect, alone or in combination with one or more of the first through seventh aspects, the level corresponds to a first quantity of configurations supported by the second wireless node and a second quantity of configurations, less than or equal to the first quantity, that supports communications using an enhanced duplexing capability of the second wireless node.

In a ninth aspect, alone or in combination with one or more of the first through eighth aspects, the level corresponds to a ratio between a supported data rate of the second wireless node when operating in an enhanced duplexing mode and a supported data rate of the second wireless node when not operating in the enhanced duplexing mode, and not operating in the enhanced duplexing mode is associated with operating in a half-duplex mode. In a tenth aspect, alone or in combination with one or more of the first through ninth aspects, each level in the plurality of levels corresponds to a ratio between a supported amount of traffic of the second wireless node when operating in an enhanced duplexing mode and a supported amount of traffic of the second wireless node when not operating in the enhanced duplexing mode, and not operating in the enhanced duplexing mode is associated with operating in a half-duplex mode.

In an eleventh aspect, alone or in combination with one or more of the first through tenth aspects, the enhanced duplexing capability signaling indicates a single level corresponding to a single threshold of a measured metric, and the single threshold is associated with a received power, a received quality, an amount of interference, an amount of self-interference, an amount of leakage, or a supported data rate. In a twelfth aspect, alone or in combination with one or more of the first through eleventh aspects, the enhanced duplexing capability signaling indicates a single level corresponding to a single threshold of a measured metric, and the single threshold is associated with a lack of time alignment or a lack of guard band associated with the supported enhanced duplexing capability of the first wireless node.

In a thirteenth aspect, alone or in combination with one or more of the first through twelfth aspects, the enhanced duplexing capability signaling corresponds to a full-duplex capability of the second wireless node. In a fourteenth aspect, alone or in combination with one or more of the first through thirteenth aspects, the enhanced duplexing capability signaling corresponds to a multiplexing capability of the second wireless node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
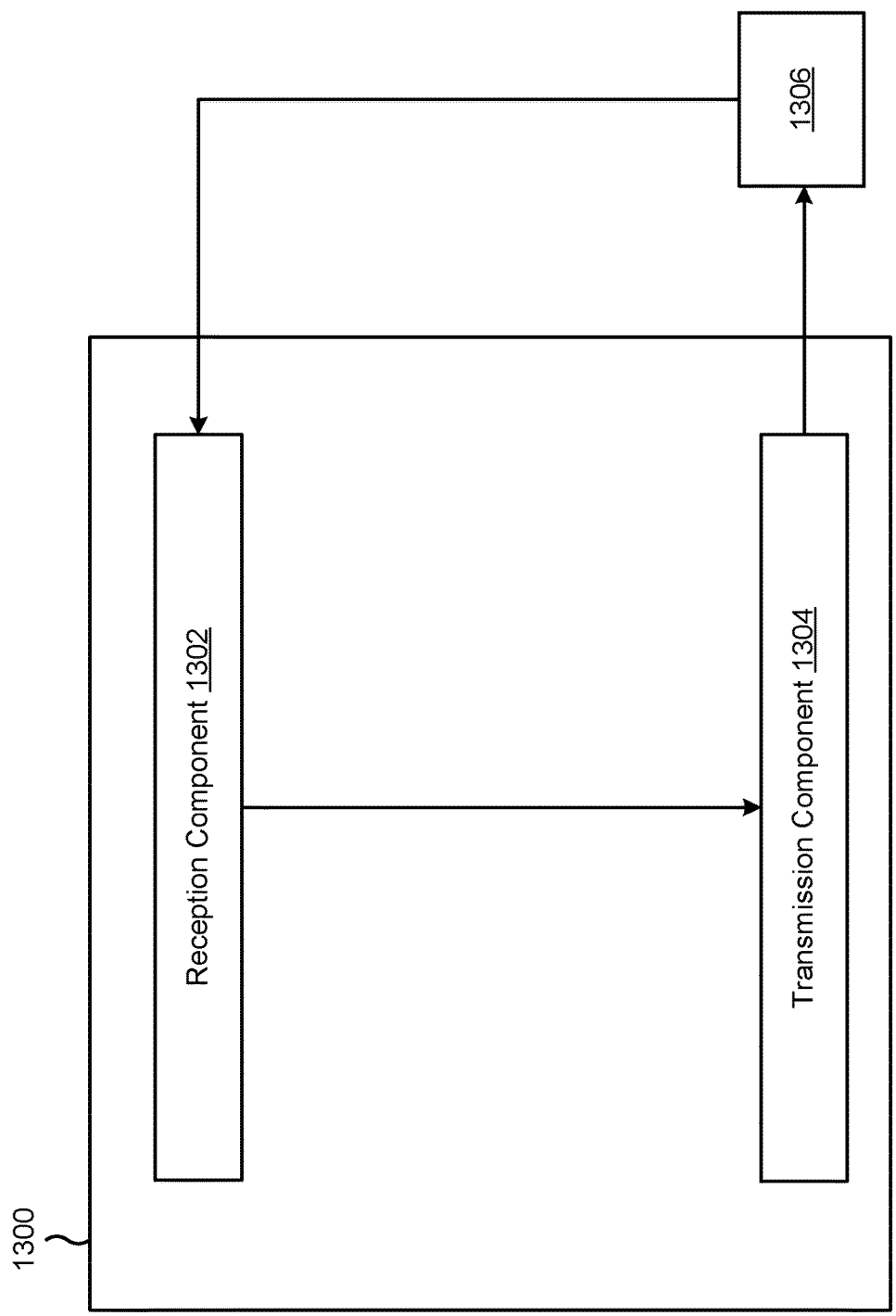
FIGS. 13-14 are block diagrams of example apparatuses for wireless communication, in accordance with the present disclosure.

FIG. 13 is a block diagram of an example apparatus 1300 for wireless communication. The apparatus 1300 may be a first wireless node, or a first wireless node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 10 and 12. Additionally, or alternatively, the apparatus 1300 may be configured to perform one or more processes described herein, such as process 1000 of FIG. 10, process 1200 of FIG. 12, or a combination thereof. In some aspects, the apparatus 1300 and/or one or more components shown in FIG. 13 may include one or more components of the first wireless node described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the first wireless node described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the first wireless node described above in connection with FIG. 2. In some aspects, the transmission component 1304 may be collocated with the reception component 1302 in a transceiver.

The transmission component 1304 may transmit enhanced duplexing capability signaling that indicates a level from a plurality of levels, wherein the level corresponds to a supported enhanced duplexing capability of the first wireless node. The transmission component 1304 may communicate with at least a second wireless node based at least in part on the supported enhanced duplexing capability of the first wireless node.

The reception component 1302 may receive enhanced duplexing capability signaling that indicates a level from a plurality of levels, wherein the level corresponds to a supported enhanced duplexing capability of a second wireless node. The transmission component 1304 may communicate with the second wireless node based at least in part on the enhanced duplexing capability signaling.

The reception component 1302 may receive the enhanced duplexing capability signaling from the second wireless node. The reception component 1302 may receive the enhanced duplexing capability signaling from a control node or a third wireless node. The transmission component 1304 may forward the enhanced duplexing capability signaling received from the second wireless node to a control node or a third wireless node. The transmission component 1304 may communicate with the second wireless node based at least in part on a configuration received from a control node, wherein the configuration includes one or more of scheduling information or a resource allocation.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
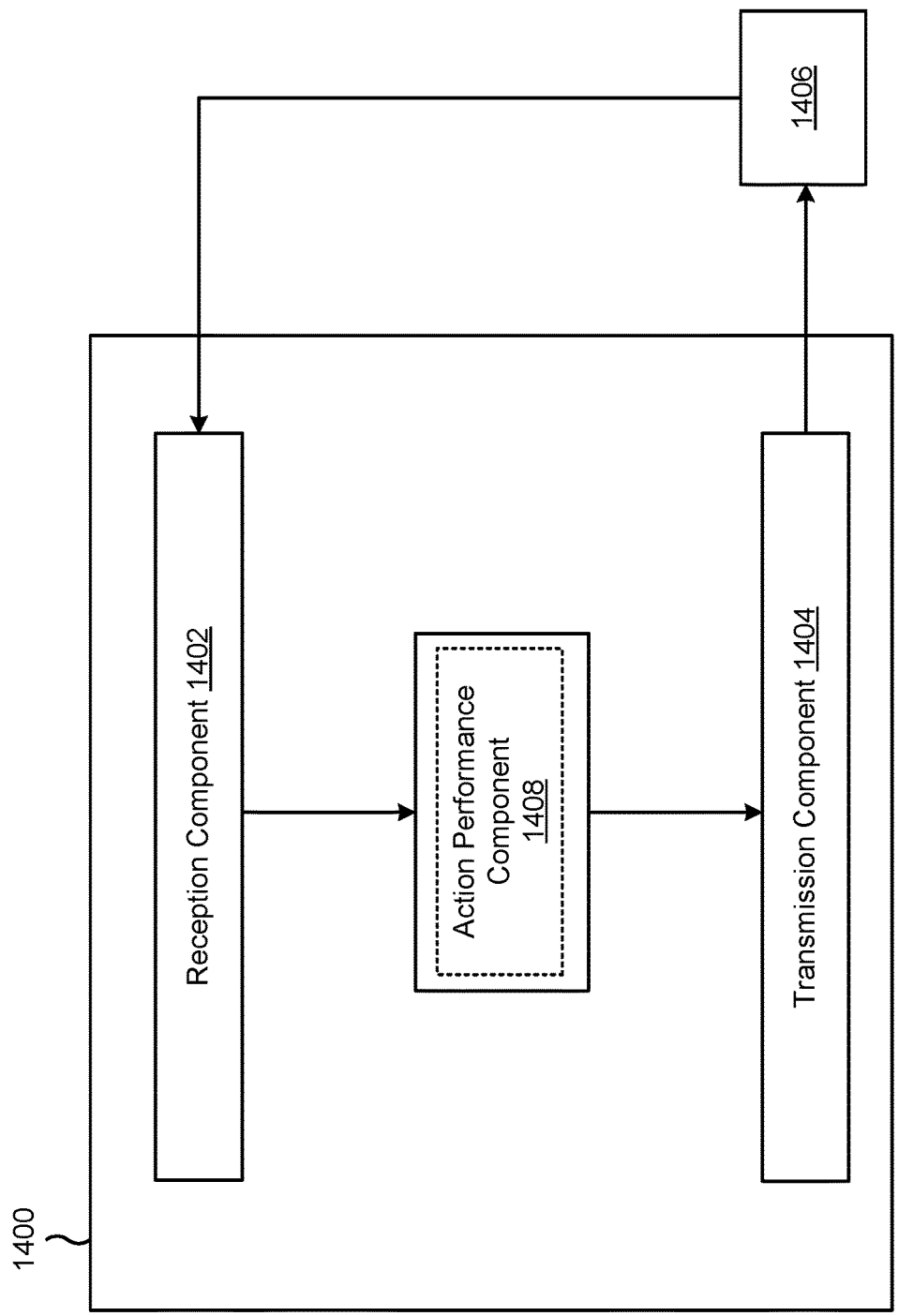

FIG. 14 is a block diagram of an example apparatus 1400 for wireless communication. The apparatus 1400 may be a control node, or a control node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include an action performance component 1408, among other examples.

In some aspects, the apparatus 1400 may be configured to perform one or more operations described herein in connection with FIG. 11. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the control node described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the control node described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the control node described above in connection with FIG. 2. In some aspects, the transmission component 1404 may be collocated with the reception component 1402 in a transceiver.

The reception component 1402 may receive, from a first wireless node, enhanced duplexing capability signaling that indicates a level from a plurality of levels, wherein the level corresponds to a supported enhanced duplexing capability of the first wireless node. The action performance component 1408 may perform an action for one or more of the first wireless node or a second wireless node based at least in part on the enhanced duplexing capability signaling received from the first wireless node. In some aspects, the action performance component 1408 may include one or more antennas, a demodulator, a MIMO detector, a receive processor, a controller/processor, a memory, or a combination thereof, of the node described above in connection with FIG. 2.

The action performance component 1408 may determine an operating mode for one or more of the first wireless node or the second wireless node. The action performance component 1408 may allocate resources for one or more of the first wireless node or the second wireless node. The action performance component 1408 may perform scheduling for one or more of the first wireless node or the second wireless node. The action performance component 1408 may determine a time division duplex configuration for one or more of the first wireless node or the second wireless node. The action performance component 1408 may manage a topology for one or more of the first wireless node or the second wireless node. The action performance component 1408 may manage a routing for one or more of the first wireless node or the second wireless node. The action performance component 1408 may manage a handover for one or more of the first wireless node or the second wireless node. The action performance component 1408 may determine a dual connectivity configuration or a carrier aggregation configuration for one or more of the first wireless node or the second wireless node.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first wireless node, comprising: transmitting enhanced duplexing capability signaling that indicates a level from a plurality of levels, wherein the level corresponds to a supported enhanced duplexing capability of the first wireless node; and communicating with at least a second wireless node based at least in part on the supported enhanced duplexing capability of the first wireless node.

Aspect 2: The method of Aspect 1, wherein transmitting the enhanced duplexing capability signaling comprises transmitting the enhanced duplexing capability signaling to the second wireless node.

Aspect 3: The method of any of Aspects 1 through 2, wherein the second wireless node is a serving node of the first wireless node, and wherein the first wireless node is a first integrated access and backhaul (IAB) node, and the second wireless node is a second IAB node or an IAB donor that is the serving node of the first IAB node.

Aspect 4: The method of any of Aspects 1 through 3, wherein transmitting the enhanced duplexing capability signaling comprises transmitting the enhanced duplexing capability signaling to a control node, wherein the control node is an integrated access and backhaul (IAB) donor of the first wireless node.

Aspect 5: The method of any of Aspects 1 through 4, wherein the level corresponds to a threshold of a measured metric, wherein an association between the level and the threshold is preconfigured for the first wireless node, or is indicated to the first wireless node by a control node or the second wireless node, and wherein the measured metric is associated with a received power, a received quality, an amount of interference, an amount of self-interference, or an amount of leakage.

Aspect 6: The method of any of Aspects 1 through 5, wherein the level corresponds to a setting used to enable the supported enhanced duplexing capability of the first wireless node, wherein an association between the level and the setting for enabling the supported enhanced duplexing capability is preconfigured for the first wireless node, or is indicated to the first wireless node by a control node or the second wireless node.

Aspect 7: The method of any of Aspects 1 through 6, wherein the level corresponds to a first quantity of configurations supported by the first wireless node and a second quantity of configurations, less than or equal to the first quantity, that supports communications using an enhanced duplexing capability of the first wireless node.

Aspect 8: The method of any of Aspects 1 through 7, wherein the level corresponds to a ratio between a supported data rate of the first wireless node when operating in an enhanced duplexing mode and a supported data rate of the first wireless node when not operating in the enhanced duplexing mode, and wherein not operating in the enhanced duplexing mode is associated with operating in a half-duplex mode.

Aspect 9: The method of any of Aspects 1 through 8, wherein the level corresponds to a ratio between a supported amount of traffic of the first wireless node when operating in an enhanced duplexing mode and a supported amount of traffic of the first wireless node when not operating in the enhanced duplexing mode, and wherein not operating in the enhanced duplexing mode is associated with operating in a half-duplex mode.

Aspect 10: The method of any of Aspects 1 through 9, wherein the enhanced duplexing capability signaling indicates a single level corresponding to a single threshold of a measured metric, wherein the single threshold is associated with a received power, a received quality, an amount of interference, an amount of self-interference, an amount of leakage, or a supported data rate, or the single threshold is associated with a lack of time alignment or a lack of guard band associated with the supported enhanced duplexing capability of the first wireless node.

Aspect 11: The method of any of Aspects 1 through 10, wherein: the enhanced duplexing capability signaling corresponds to a full-duplex capability of the first wireless node; or the enhanced duplexing capability signaling corresponds to a multiplexing capability of the first wireless node.

Aspect 12: A method of wireless communication performed by a control node, comprising: receiving, from a first wireless node, enhanced duplexing capability signaling that indicates a level from a plurality of levels, wherein the level corresponds to a supported enhanced duplexing capability of the first wireless node; and performing an action for one or more of the first wireless node or a second wireless node based at least in part on the enhanced duplexing capability signaling received from the first wireless node.

Aspect 13: The method of Aspect 12, wherein the control node is an integrated access and backhaul (IAB) donor of the first wireless node, the first wireless node is a first IAB node, and the second wireless node is a second IAB node.

Aspect 14: The method of any of Aspects 12 through 13, wherein: the level corresponds to a threshold of a measured metric, wherein an association between the level and the threshold is preconfigured for the first wireless node, or is indicated to the first wireless node by the control node or the second wireless node, and wherein the measured metric is associated with a received power, a received quality, an amount of interference, an amount of self-interference, or an amount of leakage; or the level corresponds to a setting used to enable the supported enhanced duplexing capability of the first wireless node, wherein an association between the level and the setting for enabling the supported enhanced duplexing capability is preconfigured for the first wireless node, or is indicated to the first wireless node by the control node or the second wireless node.

Aspect 15: The method of any of Aspects 12 through 14, wherein: the level corresponds to a first quantity of configurations supported by the first wireless node and a second quantity of configurations, less than or equal to the first quantity, that supports communications using an enhanced duplexing capability of the first wireless node; the level corresponds to a ratio between a supported data rate of the first wireless node when operating in the enhanced duplexing mode and a supported data rate of the first wireless node when not operating in the enhanced duplexing mode, and wherein not operating in the enhanced duplexing mode is associated with operating in a half-duplex mode; or the level corresponds to a ratio between a supported amount of traffic of the first wireless node when operating in the enhanced duplexing mode and a supported amount of traffic of the first wireless node when not operating in the enhanced duplexing mode, and wherein not operating in the enhanced duplexing mode is associated with operating in the half-duplex mode.

Aspect 16: The method of any of Aspects 12 through 15, wherein the enhanced duplexing capability signaling indicates a single level corresponding to a single threshold of a measured metric, wherein the single threshold is associated with a received power, a received quality, an amount of interference, an amount of self-interference, an amount of leakage, or a supported data rate, or the single threshold is associated with a lack of time alignment or a lack of guard band associated with the supported enhanced duplexing capability of the first wireless node.

Aspect 17: The method of any of Aspects 12 through 16, wherein performing the action for one or more of the first wireless node or the second wireless node comprises one or more of: determining an operating mode for one or more of the first wireless node or the second wireless node; allocating resources for one or more of the first wireless node or the second wireless node; performing scheduling for one or more of the first wireless node or the second wireless node; determining a time division duplex configuration for one or more of the first wireless node or the second wireless node; managing a topology for one or more of the first wireless node or the second wireless node; managing a routing for one or more of the first wireless node or the second wireless node; managing a handover for one or more of the first wireless node or the second wireless node; or determining a dual connectivity configuration or a carrier aggregation configuration for one or more of the first wireless node or the second wireless node.

Aspect 18: A method of wireless communication performed by a first wireless node, comprising: receiving enhanced duplexing capability signaling that indicates a level from a plurality of levels, wherein the level corresponds to a supported enhanced duplexing capability of a second wireless node; and communicating with the second wireless node based at least in part on the enhanced duplexing capability signaling.

Aspect 19: The method of Aspect 18, wherein: receiving the enhanced duplexing capability signaling comprises receiving the enhanced duplexing capability signaling from the second wireless node; or receiving the enhanced duplexing capability signaling comprises receiving the enhanced duplexing capability signaling from a control node or a third wireless node.

Aspect 20: The method of any of Aspects 18 through 19, further comprising: forwarding the enhanced duplexing capability signaling received from the second wireless node to a control node or a third wireless node.

Aspect 21: The method of any of Aspects 18 through 20, wherein communicating with the second wireless node comprises communicating with the second wireless node based at least in part on a configuration received from a control node, wherein the configuration includes one or more of scheduling information or a resource allocation.

Aspect 22: The method of any of Aspects 18 through 21, wherein the first wireless node is a first integrated access and backhaul (IAB) node, and the second wireless node is a second IAB node.

Aspect 23: The method of any of Aspects 18 through 22, wherein: the level corresponds to a threshold of a measured metric, wherein an association between the level and the threshold is preconfigured for the second wireless node, or is indicated to the second wireless node by the first wireless node, and wherein the measured metric is associated with a received power, a received quality, an amount of interference, an amount of self-interference, or an amount of leakage; or the level corresponds to a setting used to enable the supported enhanced duplexing capability of the second wireless node, wherein an association between the level and the setting for enabling the supported enhanced duplexing capability is preconfigured for the second wireless node, or is indicated to the second wireless node by the first wireless node.

Aspect 24: The method of any of Aspects 18 through 23, wherein: the level corresponds to a first quantity of configurations supported by the second wireless node and a second quantity of configurations, less than or equal to the first quantity, that supports communications using an enhanced duplexing capability of the second wireless node; or the level corresponds to a ratio between a supported data rate of the second wireless node when operating in the enhanced duplexing mode and a supported data rate of the second wireless node when not operating in the enhanced duplexing mode, and wherein not operating in the enhanced duplexing mode is associated with operating in a half-duplex mode.

Aspect 25: The method of any of Aspects 18 through 24, wherein each level in the plurality of levels corresponds to a ratio between a supported amount of traffic of the second wireless node when operating in an enhanced duplexing mode and a supported amount of traffic of the second wireless node when not operating in the enhanced duplexing mode, and wherein not operating in the enhanced duplexing mode is associated with operating in a half-duplex mode.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless node, comprising:
   transmitting enhanced duplexing capability signaling that indicates a level from a plurality of levels, wherein the level corresponds to a setting used to enable a supported enhanced duplexing capability of the first wireless node, wherein the supported enhanced duplexing capability indicates an ability of the first wireless node to perform simultaneous transmissions and receptions, and wherein the setting comprises:
   a threshold for a maximum transmit power used to enable the supported enhanced duplexing capability of the first wireless node,
   a threshold for a receive power used to enable the supported enhanced duplexing capability of the first wireless node,
   a threshold for a data rate used to enable the supported enhanced duplexing capability of the first wireless node,
   a threshold for a modulation and coding scheme used to enable the supported enhanced duplexing capability of the first wireless node,
   a threshold for a supported number of layers used to enable the supported enhanced duplexing capability of the first wireless node,
   an amount of guard bands used to enable the supported enhanced duplexing capability of the first wireless node, or
   an amount of time alignment to enable the supported enhanced duplexing capability of the first wireless node; and
   communicating with at least a second wireless node based at least in part on the supported enhanced duplexing capability of the first wireless node.

2. The method of claim 1, wherein transmitting the enhanced duplexing capability signaling comprises transmitting the enhanced duplexing capability signaling to the second wireless node.

3. The method of claim 1, wherein the second wireless node is a serving node of the first wireless node, and wherein the first wireless node is a first integrated access and backhaul (IAB) node, and the second wireless node is a second IAB node or an IAB donor that is the serving node of the first IAB node.

4. The method of claim 1, wherein transmitting the enhanced duplexing capability signaling comprises transmitting the enhanced duplexing capability signaling to a control node, wherein the control node is an integrated access and backhaul (IAB) donor of the first wireless node.

5. The method of claim 1, wherein the level corresponds to a threshold of a measured metric, wherein an association between the level and the threshold is preconfigured for the first wireless node, or is indicated to the first wireless node by a control node or the second wireless node, and wherein the measured metric is associated with a received power, a received quality, an amount of interference, an amount of self-interference, or an amount of leakage.

6. The method of claim 1, wherein an association between the level and the setting for enabling the supported enhanced duplexing capability is preconfigured for the first wireless node.

7. The method of claim 1, wherein the level corresponds to a first quantity of configurations supported by the first wireless node and a second quantity of configurations, less than or equal to the first quantity, that supports communications using the supported enhanced duplexing capability of the first wireless node.

8. The method of claim 1, wherein the level corresponds to a ratio between a supported data rate of the first wireless node when operating in a supported enhanced duplexing mode and a supported data rate of the first wireless node when not operating in the supported enhanced duplexing mode, and wherein not operating in the supported enhanced duplexing mode is associated with operating in a half-duplex mode.

9. The method of claim 1, wherein the level corresponds to a ratio between a supported amount of traffic of the first wireless node when operating in a supported enhanced duplexing mode and a supported amount of traffic of the first wireless node when not operating in the supported enhanced duplexing mode, and wherein not operating in the supported enhanced duplexing mode is associated with operating in a half-duplex mode.

10. The method of claim 1, wherein the enhanced duplexing capability signaling indicates a single level corresponding to a single threshold of a measured metric, wherein the single threshold is associated with a received power, a received quality, an amount of interference, an amount of self-interference, an amount of leakage, or a supported data rate, or the single threshold is associated with a lack of time alignment or a lack of guard band associated with the supported enhanced duplexing capability of the first wireless node.

11. The method of claim 1, wherein:
the enhanced duplexing capability signaling corresponds to a full-duplex capability of the first wireless node; or
the enhanced duplexing capability signaling corresponds to a multiplexing capability of the first wireless node.

12. A method of wireless communication performed by a control node, comprising:
receiving, from a first wireless node, enhanced duplexing capability signaling that indicates a level from a plurality of levels, wherein the level corresponds to a setting used to enable a supported enhanced duplexing capability of the first wireless node, wherein the supported enhanced duplexing capability indicates an ability of the first wireless node to perform simultaneous transmissions and receptions, and wherein the setting comprises:
a threshold for a maximum transmit power used to enable the supported enhanced duplexing capability of the first wireless node,
a threshold for a receive power used to enable the supported enhanced duplexing capability of the first wireless node,
a threshold for a data rate used to enable the supported enhanced duplexing capability of the first wireless node,
a threshold for a modulation and coding scheme used to enable the supported enhanced duplexing capability of the first wireless node,
a threshold for a supported number of layers used to enable the supported enhanced duplexing capability of the first wireless node,
an amount of guard bands used to enable the supported enhanced duplexing capability of the first wireless node, or
an amount of time alignment to enable the supported enhanced duplexing capability of the first wireless node; and
performing an action for one or more of the first wireless node or a second wireless node based at least in part on the enhanced duplexing capability signaling received from the first wireless node.

13. The method of claim 12, wherein the control node is an integrated access and backhaul (IAB) donor of the first wireless node, the first wireless node is a first IAB node, and the second wireless node is a second IAB node.

14. The method of claim 12, wherein:
the level corresponds to a threshold of a measured metric, wherein an association between the level and the threshold is preconfigured for the first wireless node, or is indicated to the first wireless node by the control node or the second wireless node, and wherein the measured metric is associated with a received power, a received quality, an amount of interference, an amount of self-interference, or an amount of leakage; or
an association between the level and the setting for enabling the supported enhanced duplexing capability is preconfigured for the first wireless node, or is indicated to the first wireless node by the control node or the second wireless node.

15. The method of claim 12, wherein:
the level corresponds to a first quantity of configurations supported by the first wireless node and a second quantity of configurations, less than or equal to the first quantity, that supports communications using a supported enhanced duplexing capability of the first wireless node;
the level corresponds to a ratio between a supported data rate of the first wireless node when operating in the supported enhanced duplexing mode and a supported data rate of the first wireless node when not operating in the supported enhanced duplexing mode, and wherein not operating in the supported enhanced duplexing mode is associated with operating in a half-duplex mode; or
the level corresponds to a ratio between a supported amount of traffic of the first wireless node when operating in the supported enhanced duplexing mode and a supported amount of traffic of the first wireless node when not operating in the supported enhanced duplexing mode, and wherein not operating in the supported enhanced duplexing mode is associated with operating in the half-duplex mode.

16. The method of claim 12, wherein the enhanced duplexing capability signaling indicates a single level corresponding to a single threshold of a measured metric, wherein the single threshold is associated with a received power, a received quality, an amount of interference, an amount of self-interference, an amount of leakage, or a supported data rate, or the single threshold is associated with a lack of time alignment or a lack of guard band associated with the supported enhanced duplexing capability of the first wireless node.

17. The method of claim 12, wherein performing the action for one or more of the first wireless node or the second wireless node comprises one or more of:
determining an operating mode for one or more of the first wireless node or the second wireless node;
allocating resources for one or more of the first wireless node or the second wireless node;
performing scheduling for one or more of the first wireless node or the second wireless node;
determining a time division duplex configuration for one or more of the first wireless node or the second wireless node;
managing a topology for one or more of the first wireless node or the second wireless node;
managing a routing for one or more of the first wireless node or the second wireless node;
managing a handover for one or more of the first wireless node or the second wireless node; or
determining a dual connectivity configuration or a carrier aggregation configuration for one or more of the first wireless node or the second wireless node.

18. A method of wireless communication performed by a first wireless node, comprising:
receiving enhanced duplexing capability signaling that indicates a level from a plurality of levels, wherein the level corresponds to a setting used to enable a supported enhanced duplexing capability of a second wireless node, wherein the supported enhanced duplexing capability indicates an ability of the second wireless node to perform simultaneous transmissions and receptions, and wherein the setting comprises:
a threshold for a maximum transmit power used to enable the supported enhanced duplexing capability of the second wireless node,
a threshold for a receive power used to enable the supported enhanced duplexing capability of the second wireless node, a threshold for a data rate used to enable the supported enhanced duplexing capability of the second wireless node, a threshold for a modulation and coding scheme used to enable the supported enhanced duplexing capability of the second wireless node, a threshold for a supported number of layers used to enable the supported enhanced duplexing capability of the second wireless node, an amount of guard bands used to enable the supported enhanced duplexing capability of the second wireless node, or an amount of time alignment to enable the supported enhanced duplexing capability of the second wireless node; and communicating with the second wireless node based at least in part on the enhanced duplexing capability signaling.

19. The method of claim 18, wherein:
receiving the enhanced duplexing capability signaling comprises receiving the enhanced duplexing capability signaling from the second wireless node; or
receiving the enhanced duplexing capability signaling comprises receiving the enhanced duplexing capability signaling from a control node or a third wireless node.

20. The method of claim 18, further comprising:
forwarding the enhanced duplexing capability signaling received from the second wireless node to a control node or a third wireless node.

21. The method of claim 18, wherein communicating with the second wireless node comprises communicating with the second wireless node based at least in part on a configuration received from a control node, wherein the configuration includes one or more of scheduling information or a resource allocation.

22. The method of claim 18, wherein the first wireless node is a first integrated access and backhaul (IAB) node, and the second wireless node is a second IAB node.

23. The method of claim 18, wherein:
the level corresponds to a threshold of a measured metric, wherein an association between the level and the threshold is preconfigured for the second wireless node, or is indicated to the second wireless node by the first wireless node, and wherein the measured metric is associated with a received power, a received quality, an amount of interference, an amount of self-interference, or an amount of leakage; or
an association between the level and the setting for enabling the supported enhanced duplexing capability is preconfigured for the second wireless node, or is indicated to the second wireless node by the first wireless node.

24. The method of claim 18, wherein:
the level corresponds to a first quantity of configurations supported by the second wireless node and a second quantity of configurations, less than or equal to the first quantity, that supports communications using the supported enhanced duplexing capability of the second wireless node; or
the level corresponds to a ratio between a supported data rate of the second wireless node when operating in a enhanced duplexing mode and a supported data rate of the second wireless node when not operating in the supported enhanced duplexing mode, and wherein not operating in the supported enhanced duplexing mode is associated with operating in a half-duplex mode.

25. The method of claim 18, wherein each level in the plurality of levels corresponds to a ratio between a supported amount of traffic of the second wireless node when operating in a supported enhanced duplexing mode and a supported amount of traffic of the second wireless node when not operating in the supported enhanced duplexing mode, and wherein not operating in the supported enhanced duplexing mode is associated with operating in a half-duplex mode.

26. A first wireless node for wireless communication, comprising:
a memory; and
one or more processors, coupled to the memory, configured to:
transmit enhanced duplexing capability signaling that indicates a level from a plurality of levels, wherein the level corresponds to a setting used to enable a supported enhanced duplexing capability of the first wireless node, wherein the supported enhanced duplexing capability indicates an ability of the first wireless node to perform simultaneous transmissions and receptions, and wherein the setting comprises:
a threshold for a maximum transmit power used to enable the supported enhanced duplexing capability of the first wireless node,
a threshold for a receive power used to enable the supported enhanced duplexing capability of the first wireless node,
a threshold for a data rate used to enable the supported enhanced duplexing capability of the first wireless node,
a threshold for a modulation and coding scheme used to enable the supported enhanced duplexing capability of the first wireless node,
a threshold for a supported number of layers used to enable the supported enhanced duplexing capability of the first wireless node,
an amount of guard bands used to enable the supported enhanced duplexing capability of the first wireless node, or
an amount of time alignment to enable the supported enhanced duplexing capability of the first wireless node; and
communicate with at least a second wireless node based at least in part on the supported enhanced duplexing capability of the first wireless node.

27. The first wireless node of claim 26, wherein the one or more processors, to transmit the enhanced duplexing capability signaling, are configured to:
transmit the enhanced duplexing capability signaling to the second wireless node; or
transmit the enhanced duplexing capability signaling to a control node, wherein the control node is an integrated access and backhaul (TAB) donor of the first wireless node.

28. The first wireless node of claim 26, wherein the second wireless node is a serving node of the first wireless node, and wherein the first wireless node is a first integrated access and backhaul (IAB) node, and the second wireless node is a second TAB node or an IAB donor that is the serving node of the first TAB node.

29. The first wireless node of claim 26, wherein:
the level corresponds to a threshold of a measured metric, wherein an association between the level and the threshold is preconfigured for the first wireless node, or is indicated to the first wireless node by a control node or the second wireless node, and wherein the measured metric is associated with a received power, a received quality, an amount of interference, an amount of self-interference, or an amount of leakage;
an association between the level and the setting for enabling the supported enhanced duplexing capability is preconfigured for the first wireless node, or is indicated to the first wireless node by the control node or the second wireless node; or
the level corresponds to a first quantity of configurations supported by the first wireless node and a second quantity of configurations, less than or equal to the first quantity, that supports communications using the supported enhanced duplexing capability of the first wireless node.

30. The first wireless node of claim 26, wherein:
the level corresponds to a ratio between a supported data rate of the first wireless node when operating in a supported enhanced duplexing mode and a supported data rate of the first wireless node when not operating in the supported enhanced duplexing mode, and wherein not operating in the supported enhanced duplexing mode is associated with operating in a half-duplex mode; or
the level corresponds to a ratio between a supported amount of traffic of the first wireless node when operating in the supported enhanced duplexing mode and a supported amount of traffic of the first wireless node when not operating in the supported enhanced duplexing mode, and wherein not operating in the supported enhanced duplexing mode is associated with operating in the half-duplex mode.

* * * * *